(12) United States Patent
Swinson et al.

(10) Patent No.: US 11,763,341 B1
(45) Date of Patent: *Sep. 19, 2023

(54) SYSTEM AND METHOD FOR QUANTIFICATION OF LATENT EFFECTS ON USER INTERACTIONS WITH AN ONLINE PRESENCE IN A DISTRIBUTED COMPUTER NETWORK RESULTING FROM CONTENT DISTRIBUTED THROUGH A DISTINCT CONTENT DELIVERY NETWORK

(71) Applicant: Tatari, Inc., San Francisco, CA (US)

(72) Inventors: Michael D. Swinson, Santa Monica, CA (US); Lin O'Driscoll, Mammoth Lakes, CA (US); Wei Chen, Santa Monica, CA (US)

(73) Assignee: TATARI, INC., San Francisco, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/373,311

(22) Filed: Jul. 12, 2021

Related U.S. Application Data

(63) Continuation of application No. 16/363,801, filed on Mar. 25, 2019, now Pat. No. 11,132,706.
(Continued)

(51) Int. Cl.
*G06Q 30/0242* (2023.01)
*G06Q 30/0251* (2023.01)
(Continued)

(52) U.S. Cl.
CPC ..... *G06Q 30/0244* (2013.01); *G06Q 30/0255* (2013.01); *G06Q 30/0277* (2013.01); *H04L 67/535* (2022.05)

(58) Field of Classification Search
None
See application file for complete search history.

(56) References Cited

U.S. PATENT DOCUMENTS 8,386,310 B2   2/2013   Weyer
8,510,770 B1   8/2013   Oztaskent
(Continued)

FOREIGN PATENT DOCUMENTS

GB    2550839          12/2017
WO    WO 2014011139    1/2014
WO    WO 2020005240    1/2020

OTHER PUBLICATIONS

Bhatia et al., Method and System of Scaling Online-Offline Ad Effectiveness Measurements across Devices in a Network, IPCOM000226497D; IP.com Electronic Publication Date: Apr. 9, 2013.*

(Continued)

*Primary Examiner* — David J Stoltenberg
(74) *Attorney, Agent, or Firm* — SPRINKLW IP LAW GROUP

(57) ABSTRACT

Embodiments of the present disclosure relate to data correlation of data pertaining to content distributed through distinct content delivery networks including offline networks and data related to user interaction with an online presence on the distributed computer network and uses for such correlated data, including to measure and quantify latent effects of the content distributed through a distinct content delivery network, such as an offline network, on user's interactions with the online presence on the distributed computer network.

18 Claims, 12 Drawing Sheets

Related U.S. Application Data

(60) Provisional application No. 62/648,155, filed on Mar. 26, 2018, provisional application No. 62/781,336, filed on Dec. 18, 2018.

(51) Int. Cl.
    *G06Q 30/0241*     (2023.01)
    *H04L 67/50*     (2022.01)

(56) References Cited

U.S. PATENT DOCUMENTS

| | | |
|---|---|---|
| 8,762,201 B1 | 6/2014 | Noonan |
| 9,852,163 B2 | 12/2017 | Srivastava |
| 10,467,653 B1 | 11/2019 | Avedissian |
| 10,497,021 B1 | 12/2019 | Eberstein |
| 11,132,706 B1 | 9/2021 | Swinson |
| 11,212,566 B1 | 12/2021 | Swinson |
| 11,334,911 B1 | 5/2022 | Swinson |
| 11,334,912 B1 | 5/2022 | Chen |
| 11,348,136 B1 | 5/2022 | Swinson |
| 11,503,351 B2 | 11/2022 | Swinson |
| 11,562,393 B1 | 1/2023 | Chen |
| 2007/0174114 A1 | 7/2007 | Bigby |
| 2008/0004884 A1 | 1/2008 | Flake |
| 2008/0082381 A1 | 4/2008 | Muller |
| 2008/0235089 A1 | 9/2008 | Weyer |
| 2008/0255904 A1 | 10/2008 | Park |
| 2008/0256061 A1 | 10/2008 | Chang |
| 2009/0006188 A1 | 1/2009 | Guo |
| 2009/0049468 A1 | 2/2009 | Shkedi |
| 2009/0172728 A1 | 7/2009 | Shkedi |
| 2009/0254420 A1 | 10/2009 | Curd |
| 2010/0082424 A1 | 4/2010 | Yemeni |
| 2010/0228593 A1 | 9/2010 | Belwadi |
| 2010/0287029 A1 | 11/2010 | Dodge |
| 2011/0087546 A1 | 4/2011 | Fordyce |
| 2011/0119126 A1 | 5/2011 | Park |
| 2011/0167145 A1 | 7/2011 | Bush |
| 2011/0231245 A1 | 9/2011 | Bhatia |
| 2011/0246297 A1 | 10/2011 | Buchalter |
| 2011/0302022 A1 | 12/2011 | Fordyce |
| 2012/0054019 A1 | 3/2012 | Kitts |
| 2012/0054021 A1* | 3/2012 | Kitts ............... G06Q 30/0243 705/14.42 |
| 2012/0072997 A1 | 3/2012 | Carlson |
| 2012/0096489 A1 | 4/2012 | Shkedi |
| 2012/0109749 A1 | 5/2012 | Subramanian |
| 2012/0158505 A1 | 6/2012 | Jaladanki |
| 2012/0303414 A1 | 11/2012 | Dodge |
| 2013/0046621 A1 | 2/2013 | Asseoff |
| 2013/0117454 A1 | 5/2013 | Rangarajan |
| 2013/0261482 A1 | 10/2013 | Marziliano |
| 2013/0268357 A1 | 10/2013 | Heath |
| 2014/0006158 A1 | 1/2014 | Cooper |
| 2014/0012659 A1 | 1/2014 | Yan |
| 2014/0040020 A1 | 2/2014 | Shanmugam |
| 2014/0074587 A1 | 3/2014 | Briggs |
| 2014/0082664 A1 | 3/2014 | Shkedi |
| 2014/0100947 A1 | 4/2014 | Kitts |
| 2014/0164101 A1 | 6/2014 | S |
| 2014/0222549 A1 | 8/2014 | Bruich |
| 2014/0223458 A1 | 8/2014 | Smith |
| 2014/0236705 A1 | 8/2014 | Shao |
| 2014/0244368 A1 | 8/2014 | Singhania |
| 2014/0257979 A1 | 9/2014 | Luke |
| 2014/0289004 A1 | 9/2014 | Monforte |
| 2014/0316883 A1 | 10/2014 | Kitts |
| 2014/0337122 A1 | 11/2014 | Bansal |
| 2014/0358666 A1 | 12/2014 | Baghaie |
| 2014/0379428 A1 | 12/2014 | Phansalkar |
| 2015/0046249 A1 | 2/2015 | Qi |
| 2015/0066626 A1 | 3/2015 | Farahat |
| 2015/0149277 A1 | 5/2015 | Mankoff |
| 2015/0154632 A1 | 6/2015 | Jindal |
| 2015/0186925 A1 | 7/2015 | Chittailappilly |
| 2015/0235261 A1 | 8/2015 | Shulman |
| 2015/0237395 A1 | 8/2015 | Barney |
| 2015/0262221 A1 | 9/2015 | Nakano |
| 2015/0269606 A1 | 9/2015 | Hewett |
| 2015/0341684 A1 | 11/2015 | Kitts |
| 2015/0348119 A1 | 12/2015 | Ferber |
| 2015/0350706 A1 | 12/2015 | Ferber |
| 2016/0019582 A1 | 1/2016 | Bindra |
| 2016/0027056 A1* | 1/2016 | Taslimi ............... G06Q 30/0277 705/14.45 |
| 2016/0117355 A1 | 4/2016 | Krishnamurthy |
| 2016/0134934 A1 | 5/2016 | Jared |
| 2016/0155141 A1 | 6/2016 | Song |
| 2016/0180375 A1 | 6/2016 | Rose |
| 2016/0210658 A1 | 7/2016 | Chittilappilly |
| 2016/0210659 A1 | 7/2016 | Chittilappilly |
| 2016/0225014 A1 | 8/2016 | Mitra |
| 2016/0239571 A1 | 8/2016 | Rowe |
| 2016/0358227 A1 | 12/2016 | McAfee |
| 2017/0034591 A1 | 2/2017 | Ray |
| 2017/0091806 A1 | 3/2017 | Cole |
| 2017/0091809 A1 | 3/2017 | Liu |
| 2017/0091810 A1 | 3/2017 | McGovern |
| 2017/0195748 A1 | 7/2017 | Shkedi |
| 2017/0201374 A1 | 7/2017 | Bosworth |
| 2017/0223425 A1 | 8/2017 | Kitts |
| 2017/0228768 A1 | 8/2017 | Saxena |
| 2017/0238025 A1 | 8/2017 | Riedl |
| 2017/0257410 A1 | 9/2017 | Gattis |
| 2017/0323330 A1 | 11/2017 | Chittilappilly |
| 2017/0330219 A1 | 11/2017 | Feldman |
| 2017/0337578 A1 | 11/2017 | Chittilappilly |
| 2017/0337588 A1 | 11/2017 | Chittilappilly |
| 2018/0005140 A1 | 1/2018 | Chittilappilly |
| 2018/0068343 A1 | 3/2018 | Hammock |
| 2018/0096397 A1 | 4/2018 | Goeldi |
| 2018/0139514 A1 | 5/2018 | Smith |
| 2018/0152766 A1 | 5/2018 | Kitts |
| 2018/0192128 A1 | 7/2018 | Manus |
| 2018/0218383 A1 | 8/2018 | Shen |
| 2018/0260715 A1 | 9/2018 | Yan |
| 2018/0270544 A1 | 9/2018 | Ray |
| 2018/0285469 A1 | 10/2018 | Hahn |
| 2018/0308123 A1 | 10/2018 | Zhong |
| 2018/0338189 A1 | 11/2018 | Ray |
| 2018/0357678 A1 | 12/2018 | Diorio |
| 2019/0050891 A1 | 2/2019 | Chung |
| 2019/0050893 A1 | 2/2019 | Stuttle |
| 2019/0087469 A1 | 3/2019 | Zhang |
| 2019/0104199 A1 | 4/2019 | Rothman |
| 2019/0138563 A1 | 5/2019 | Odgen |
| 2019/0141013 A1 | 5/2019 | Mail |
| 2019/0236639 A1 | 8/2019 | Mitra |
| 2019/0273961 A1 | 9/2019 | Kitts |
| 2019/0278378 A1 | 9/2019 | Yan |
| 2019/0318379 A1 | 10/2019 | Patel |
| 2019/0378074 A1 | 12/2019 | McPhatter |
| 2020/0027121 A1 | 1/2020 | Avedissian |
| 2020/0065854 A1 | 2/2020 | Eberstein |
| 2022/0086513 A1 | 3/2022 | Swinson |
| 2022/0215427 A1 | 7/2022 | Swinson |
| 2022/0237653 A1 | 7/2022 | Chen |
| 2023/0051566 A1 | 2/2023 | Swinson |
| 2023/0117593 A1 | 4/2023 | Chen |

OTHER PUBLICATIONS

2nd Notice of Allowance for U.S. Appl. No. 17/533,214, dated Aug. 12, 2022, 5 pgs.

Notice of Allowance for U.S. Appl. No. 16/705,813, dated Sep. 14, 2022, 17 Pgs.

Notice of Allowance for U.S. Appl. No. 16/706,061, dated Mar. 18, 2022, 7 pgs.

Notice of Allowance for U.S. Appl. No. 16/716,161, dated Mar. 30, 2022, 8 pgs.

Office Action for U.S. Appl. No. 16/706,061, dated Oct. 25, 2021, 15 pgs.

(56) References Cited

OTHER PUBLICATIONS

Kitts, et al., Attribution of Conversion Events to Multi-Channel Media, 2010 IEEE International Conference on Data Mining, pp. 881-886.
Office Action for U.S. Appl. No. 16/705,813, dated Nov. 23, 2021, 23 pgs.
Jungherr, Andreas, "Forecasting the pulse: How deviations from regular patterns in online data can identify offline phenomena," Internet Research, vol. 23, No. 5, pp. 589-607, at https://doi.org/10.1108/IntR-06-2012--0115.
Notice of Allowance for U.S. Appl. No. 16/365,448, dated Oct. 6, 2021, 4 pgs.
Office Action for U.S. Appl. No. 16/363,801, dated Jul. 7, 2020, 19 pgs.
Office Action for U.S. Appl. No. 16/360,456, dated Oct. 13, 2020, 13 pgs.
Office Action for U.S. Appl. No. 16/363,801, dated Jan. 15, 2021, 22 pgs.
Bhatia, Tarun, et al., Method and System of Scaling Online-Offline Ad Effectiveness Measurements across Devices in a Network, IP.com Prior Art Database Technical Disclosure, IPCOM000226497D, Apr. 9, 2013, 6 pgs.
Office Action for U.S. Appl. No. 16/705,813, dated Mar. 8, 2021, 15 pgs.
Cleveland, William S., Robust Locally Weighted Regression and Smoothing Scatterplots, Journal of the American Statistical Association, Theory and Methods Section, vol. 74, No. 368, DOI: 10.1080/01621459.1979.10481038, Dec. 1979, pp. 829-836.
Andreas F. Ruckstuhl, et al., Baseline subtraction using robust local regression estimation, Journal of Quantitative Spectroscopy and Radiative Transfer, vol. 68, Issue 2, 2001, pp. 179-193 (ISSN 0022-4073).
Lambert, Diane, et al., Online Effects of Offline Ads, in ADKDD '08: Proceedings of the 2nd International Workshop on Data Mining and Audience Intelligence for Advertising, New York: Association for Computing Machinery, pp. 10-17, 2008.
Office Action for U.S. Appl. No. 16/360,456, dated Apr. 27, 2021, 16 pgs.
Eisenberg, Andrew, et al., "SQL:2003 Has Been Published," ACM.org, SIGMOD Record, vol. 33, No. 1, Mar. 2004, pp. 119-126.
Notice of Allowance for U.S. Appl. No. 16/363,801, dated Apr. 28, 2021, 9 pgs.
Advertisement System, Method and Computer Program Product, an IP.com Prior Art Database Technical Disclosure, IPCOM000138557D, Jul. 24, 2006, 40 pgs.
Weng, Chien-I, et al., Did you LINE Today? Strategies for Creating LINE Online to Offline Customer Experiences, 49th Hawaii Int'l Conf, on System Sciences, IEEE Computer Society, 2016, pp. 2136-2145.
Office Action for U.S. Appl. No. 16/706,061, dated May 11, 2021, 18 pgs.
Office Action for U.S. Appl. No. 16/705,813, dated Jun. 21, 2021, 23 pgs.
Gallego, Victor, et al., Assessing the effect of advertising expenditures upon sales: a Bayesian structural time series model, Appl. Stoch. Model. Bus. Ind., 35, 2019, pp. 479-491, at https://doi.org/10.1002/asmb.2460, 21 pgs.
Du, Rex Y., et al., "TV Ads and Search Spikes: Toward a Deeper Understanding," MIS quarterly, Feb. 23, 2017, 35 pgs.
Kitts, Brendan, "Can Television Advertising Impact Be Measured on the Web? Web Spike Response as a Possible Conversion Tracking System for Television," in Proceedings of the Eighth Int'l Workshop on Data Mining on Online, ADKDD'14, Aug. 24-27, 2014, New York, NY, 9 pgs, at http://dx.doi.org/10.1145/2648584.2648591.
Cetintas, Suleyman, et al., Forecasting user visits for online display advertising, Inf Retrieval 16, pp. 369-390, 2013, at https://doi.org/10.1007/s10791-012-9201-4.
Komsta, L., Comparison of Several Methods of Chromatographic Baseline Removal with a New Approach Based on Quantile Regression, Chromatographia 73, 2011, pp. 721-731, at https://doi.org/10.1007/s10337-011-1962-1.
Zhang, Zhi-Min, et al., Baseline correction using adaptive iteratively reweighted penalized least squares, Analyst (www.rsc.org/analyst), 135, 2010, pp. 1138-1146, doi:10.1039/b922045c.
Baek, Sung-June, et al., Baseline correction using asymmetrically reweighted penalized least squares smoothing, Analyst (www.rsc.org/analyst), 140, 2015, pp. 250-257.
Office Action for U.S. Appl. No. 16/365,448, dated Jun. 23, 2021, 8 pgs.
Notice of Allowance for U.S. Appl. No. 17/533,214, dated Jul. 11, 2022, 6 pgs.
Office Action for U.S. Appl. No. 16/716,161, dated Dec. 9, 2021, 21 pgs.
Notice of Allowance for U.S. Appl. No. 16/360,456, dated Dec. 22, 2021, 14 pgs.
Notice of Allowance for U.S. Appl. No. 16/360,456, dated Apr. 5, 2022, 9 pgs.
Office Action for U.S. Appl. No. 16/705,813, dated Apr. 13, 2022, 25 pgs.
Office Action for U.S. Appl. No. 17/718,148, dated Mar. 15, 2023, 10 pgs.
Office Action for U.S. Appl. No. 17/977,486, dated Mar. 16, 2023, 12 pgs.
Office Action for U.S. Appl. No. 17/700,984, issued by the U.S. Patent and Trademark Office, dated Apr. 3, 2023, 12 pgs.
Fitting generalized linear models, Dec. 12, 2013, retrieved Mar. 28, 2023 at https://stat.ethz.ch/R-manual/R-devel/library/stats/html/glm.html, 7 pgs.
Al-Azmi, Abdul-Aziz Rashid, Data, Text, and Web Mining for Business Intelligence, International Journal of Data Mining & Knowledge Management Process (IJDKP), vol. 3, No. 2, Mar. 2013, 21 pgs.
Office Action for U.S. Appl. No. 17/700,984, dated Dec. 15, 2022, 8 pgs.
Notice of Allowance for U.S. Appl. No. 17/977,486, issued by the U.S. Patent and Trademark Office, dated May 16, 2023, 6 pgs.

\* cited by examiner

SYSTEM AND METHOD FOR QUANTIFICATION OF LATENT EFFECTS ON USER INTERACTIONS WITH AN ONLINE PRESENCE IN A DISTRIBUTED COMPUTER NETWORK RESULTING FROM CONTENT DISTRIBUTED THROUGH A DISTINCT CONTENT DELIVERY NETWORK

RELATED APPLICATION(S)

This application is a continuation of, and claims a benefit of priority under 35 U.S.C. 120 of the filing date of U.S. patent application Ser. No. 16/363,801, filed Mar. 25, 2019, issued as U.S. Pat. No. 11,132,706, entitled "SYSTEM AND METHOD FOR QUANTIFICATION OF LATENT EFFECTS ON USER INTERACTIONS WITH AN ONLINE PRESENCE IN A DISTRIBUTED COMPUTER NETWORK RESULTING FROM CONTENT DISTRIBUTED THROUGH A DISTINCT CONTENT DELIVERY NETWORK," which claims a benefit of priority under 35 U.S.C. § 119(e) from the filing date of U.S. Provisional Application No. 62/648,155, filed on Mar. 26, 2018, entitled "SYSTEMS AND METHODS FOR QUANTIFICATION OF LATENT EFFECTS ON USER INTERACTIONS WITH AN ONLINE PRESENCE IN A DISTRIBUTED COMPUTER NETWORK RESULTING FROM CONTENT DISTRIBUTED THROUGH A DISTINCT CONTENT DELIVERY NETWORK," by Swinson, and U.S. Provisional Application No. 62/781,336, filed on Dec. 18, 2018, entitled "SYSTEMS AND METHODS FOR CORRELATION OF USER INTERACTIONS WITH AN ONLINE PRESENCE IN A DISTRIBUTED COMPUTER NETWORK AND CONTENT DISTRIBUTED THROUGH A DISTINCT CONTENT DELIVERY NETWORK AND USES FOR SAME, INCLUDING QUANTIFICATION OF LATENT EFFECTS ON SUCH USER INTERACTIONS by Swinson and Driscoll. The entire contents of each application referenced in this paragraph are fully incorporated by reference herein in their entirety for all purposes.

TECHNICAL FIELD

The present disclosure relates generally to distributed and networked content delivery networks. More particularly, embodiments of the present disclosure relate to the measurement and quantification of user interaction with an online presence, such as a website, on a distributed computer network based on content distributed through a distinct content delivery network. Even more specifically, embodiments of the present disclosure relate to the measurement and quantification of the latent effects of content distributed through the distinct content delivery networks on user interaction with the online presence on the distributed computer network.

BACKGROUND

With the advent of the Internet, many aspects of modern life are now digitally connected through the seemingly ubiquitous smart phones, smart televisions (TV), smart home appliances, Internet of Things (IoT) devices, websites, mobile apps, etc. Even so, many more analog aspects remain disconnected from this digital world. Linear TV is an example of an offline medium that is disconnected from the digital world.

"Linear TV" refers to real time (live) television services that transmit TV program schedules. Almost all broadcast TV services can be considered as linear TV. Non-linear TV covers streamlining and on-demand programming, which can be viewed at any time and is not constrained by real-time broadcast schedules. Video-on-demand (VOD) and near video-on-demand (NVOD) transmissions of pay-per-view programs over channel feeds are examples of non-linear TV.

Because forms of TV are an offline medium, it may be difficult to automatically collect information on some viewers of TV. This creates a data gap problem. To address this data gap program, Nielsen Media Research devised audience measurement systems to determine the audience size and composition of television programming in the United States. Nielsen television ratings are gathered in one of two ways—using viewer diaries or set meters attached to TVs in selected homes. The former requires a target audience self-record their viewing habits. The latter requires a special device to collect specific viewing habits on a minute to minute basis and send the collected information to Nielsen's system over a phone line.

While Nielsen's audience measurement systems can provide some quantified measures of audience response to TV programs, the Nielsen television ratings do not measure conversion rates for TV commercials (referred to herein as "creatines" or "spots"), either from linear TV or non-linear TV. This is, in part, because there is a natural distinction between two mediums: online (e.g., search engine marketing) and offline (e.g., linear or non-linear TV). The online medium is effective when consumers are already accessing the Internet through a website or a mobile app. When a user is attracted to a product and visits a website for the product (e.g., when attracted by an advertisement on a website), there is a session associated with that advertising channel. Thus, whether such a session results in a sale (or conversion) is a relatively straightforward process that can be done through tracking the session at the website (e.g., using a tracking pixel embedded in a page or pages of the website that sends data to a server of the website operator or a third-party entity).

The offline medium, on the other hand, aims to drive consumers first to the Internet and then to the product's website or app. Unlike the online medium, there is neither session tracking nor a direct relationship between the offline medium and the desired result. Thus, suppose a spot that aired on linear TV encouraged its viewer to visit a website or download an app, it can be extremely difficult to measure the impact of that spot and quantifiably attribute any website visit or app download to the particular spot. The natural distinction between the two mediums creates a data gap between them.

From the perspective of a website, although the general traffic contribution from TV to the website can be assessed from the immediate lift approximation (e.g., after a spot aired on TV at a certain time, there is an immediate visitor lift at the website), there is not a clear tag for the sales contribution from TV. That is, each online session does not have a tag "from TV," because there is no one-to-one relationship between a website visitor and TV viewership. This creates a challenge to estimate TV contribution to website conversions.

SUMMARY

Embodiments of the present disclosure thus relate to data correlation of data pertaining to content distributed through distinct content delivery networks including offline networks and data related to user interaction with an online presence on the distributed computer network and uses for such correlated data, including to measure and quantify latent effects of the distributed content on user's interactions with the online presence on the distributed computer network.

Specifically, embodiments of a quantification system may estimate the latency factor of a retailer's creatives. In particular, certain embodiments of quantification systems may leverage rich data sets (TV viewing and retailer's online access data (e.g., app install data) and statistics), to determine a latency factor to help retailers and associated creators of creatives better understand the efficiency or efficacy of their advertising.

In particular, data of a quantification system can be utilized for a variety of purposes and ends by quantification systems. As but one example, this data can be used by the quantification system to calculate one or more metrics associated with both a creative, or group of creatives, aired by the retailer on the offline network and the retailer's presence on the online network. These metrics may include efficiency, relative performance, lift or response, conversion rate, spend per conversion, or other metrics as discussed. These metrics, or data determined therefrom, can be displayed to a user accessing the quantification system in an intuitive interface to allow the user to assess the efficacy or other insights into the retailer's creatines.

It is thus desired to quantify metrics using a latency factor which may account for the effects of the airing of a creative that occur outside of some baseline window (e.g., time period, such as 5 minutes, 10 minutes, 30 minutes, etc.) following the original airing of the creative. Such a latency factor may be associated with, or otherwise reflect, an expected response to an airing of a spot outside of the bassline window (e.g., relative to a response within the baseline window) vis a vis the retailer's online presence. Thus, a latency factor can be applied to almost any other determined metric to estimate or adjust that metric to account for user's interactions that occur outside of the baseline window and within a selected time period (e.g., 30 days, 60 days, a quarter, a year, etc.).

By determining such a latency factor, users can access and determine the potential response from a creative more quickly, improving the computer performance by allowing metrics and other data to be determined more quickly and interfaces to be generated more quickly. It also can provide the capability of measuring delayed results on a granular level. Other approaches either will not be able to gauge the full response to an individual spot, or will only be able to estimate the full response on an aggregated level. Such a latency factor may be usefully applied to a number of metrics that may be determined by a quantification system, including for example traffic lift or conversion.

In one embodiment, a quantification system may include a data store storing spot viewing data comprising data on user views of a first spot associated with an entity through an offline network, and user interaction event data comprising data on user interactions with an online presence on an online network, wherein the online presence is associated with the entity associated with the first spot. The quantification system may associate one or more user views of the first spot through the offline network with corresponding user interactions with the online presence of the entity on the online network. A first set of user views of the first spot that are associated with corresponding user interactions with the online presence on the online network may be determined and a first conditional probability curve determined for the first set of views. A latency factor can be determined based on a first portion of the first conditional probability curve corresponding to a time at a baseline time window and a second portion of the first conditional probability curve outside the baseline time window, wherein the latency factor reflects an expected response at the entity's online presence on the online network and wherein the response is a response to the spot airing on the offline network outside that time window. A metric associated with the online presence can be adjusted based on the latency factor and an interface generated based on the adjusted metric.

In certain embodiments, the spot viewing data comprises data on user views of a second spot, and the quantification system may associate one or more user views of the second spot through the offline network with corresponding user interactions with the online presence of the entity on the online network, wherein the second spot aired at a similar time to the first spot. A second set of user views of the second spot that are associated with corresponding user interactions with the online presence on the online network can be determined and a second conditional probability curve determined for the second set of views. A cumulative probability difference curve can be determined based on the first conditional probability curve and the second conditional probability curve. In this embodiment, determining the latency factor based on the first portion of the first conditional probability curve corresponding to the baseline time window and the second portion of the first conditional probability curve outside the baseline time window comprises determining a first portion of the cumulative probability difference curve corresponding to the baseline time window and a second portion of the cumulative probability difference curve outside the baseline time window.

In some embodiments, the data store of the quantification system stores spot airing data comprising data on when the spot associated with the entity was aired on the offline network, and the spot airing data is enhanced by adjusting a scheduled start time of at least one spot airing of the spot airing data.

This enhancement may be done, in one embodiment, by associating each view of the spot in the spot viewing data with a corresponding instance of the airing of the spot in the spot airing data based on time to adjust a spot viewing time of the view of the spot. The association can be done, for example using IP address associated with both a user view of the spot and the corresponding user interaction with the online presence.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference

DETAILED DESCRIPTION

Figure 1A:
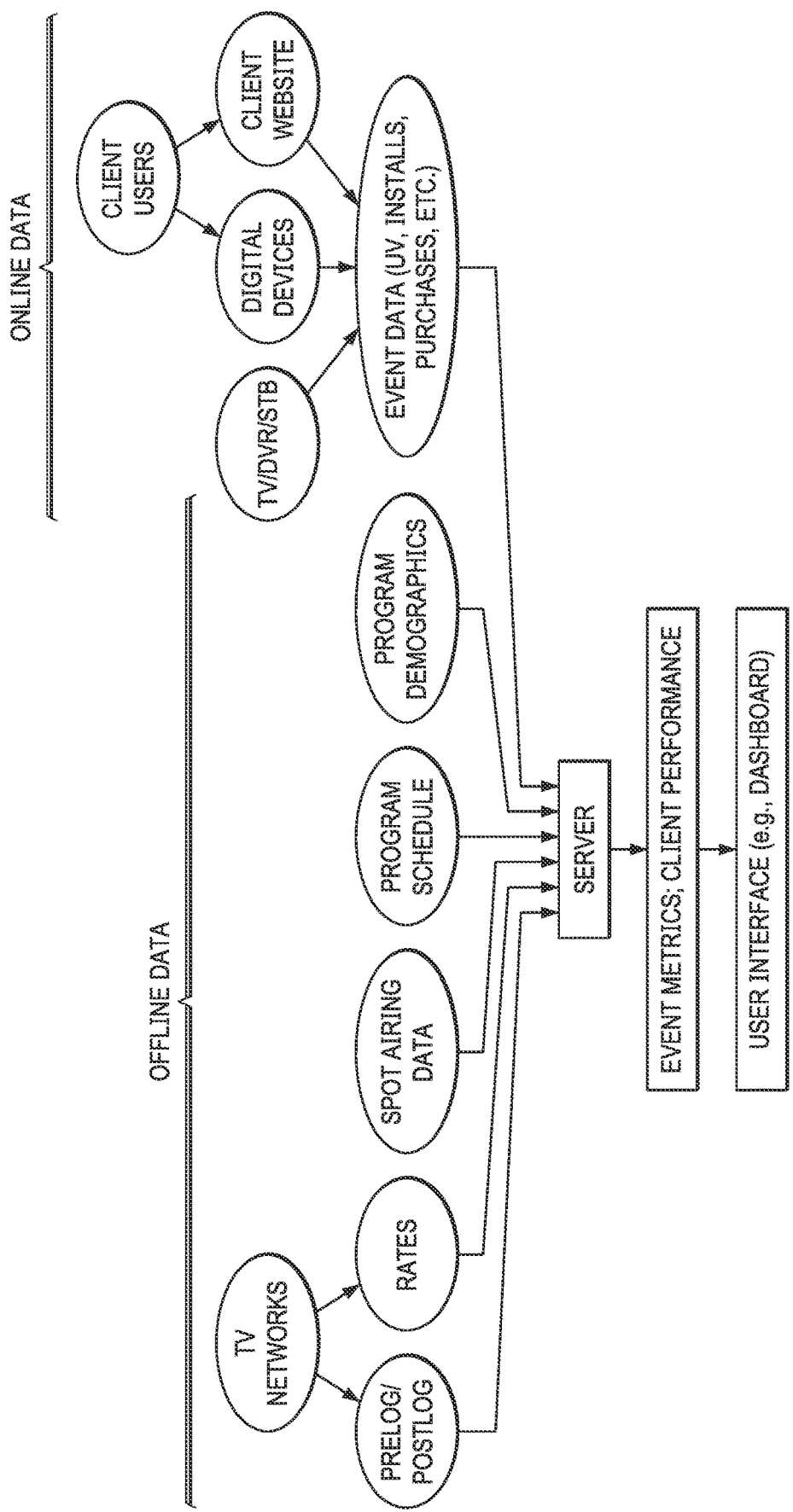
FIG. 1A is a diagram of one embodiment of a topology for a quantification system.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some context may be helpful. In the current environment for content delivery and consumption, there is a natural distinction between at least two mediums or networks. Today, there is the distribution network generally referred to as the "online" network for content distribution, where content is delivered over a computer based network such the Internet World Wide Web (WWW) or the like. There are also a number of what are considered "offline" networks for content distribution. These offline networks are traditional distribution networks such as television (TV) (whether transmitted, cable or network based) or radio.

There is a great deal of crossover between these types of distribution networks, both from a technology standpoint and from a business perspective. For example, many retailers, sellers, manufacturers or other entities (collectively retailers) of products or services (collectively products) have presences on the online distribution network (e.g., websites on the WWW, application to install on a device, or the like), and in some cases, may only have a public facing presence on the online content distribution network (e.g., may only have a website on the WWW, not any brick and mortar retail locations). These retailers may, however, advertise their products, sites applications, etc. both through an online distribution network (e.g., through search engine marketing or banner ads) or through offline distribution network (e.g., traditional TV advertisements).

Advertising through an online medium is effective when consumers are already accessing the Internet via a website or mobile application. The efficacy of such advertisements is easily assessed. When a user is attracted to the retailer's website through an advertisement in an online medium, there is a session associated with that advertising channel, so whether such session results in sale (or conversion) is relatively straightforward.

Advertisements of a retailer distributed through the offline medium, on the other hand, aim to drive consumers or other users first to the online network (e.g., Internet or WWW) and then to the retailer's site or application download. However, because of the technical impediments posed by the general separation in direct connectivity between the online distribution network and the offline distribution network, the assessment of the efficacy of advertisements distributed through the offline medium on the interaction of users with the retailer's online site or application may be extremely difficult to assess.

Embodiments of systems and methods as disclosed herein may determine certain metrics such as user views, application installs, conversions (e.g., conversion events such as retail sales or application installs) or other types of data with respect to user's interaction with a retailer's online presence that occur as a result of advertisements in the offline network. It should be noted here, that while embodiments herein are described in association with a "retailer", the term "retailer" is used purely for the sake of convince, and embodiments will apply equally well to any other entity or organization that may operate an online presence and engage in presentation of content such as advertising through an offline network without loss of generality and the term retailer as used herein and throughout will be taken to refer to all such organizations or entities.

Referring to FIG. 1A, embodiments of the systems and methods for quantification of these metrics may include one or more servers coupled to the online network (e.g., the Internet, an internet, a local area network (LAN), a wide area network (WAN), or the like). These systems can thus receive, collect or otherwise obtain a wide variety of data through the online network. This data may include data on a retailer's site such as event data associated with user views of the retailer's website, application installs, product purchases, time spent on the retailer's site or a wide variety of other data (including analytics data) associated with a user interaction with the retailer's site (or application, which collectively will be understood to be referred to when a retailer's site or online presence is discussed). Such data is usually associated with an Internet Protocol (IP) address of the user's device used to access the retailer's online presence.

Additionally, data that may be obtained at such quantification systems may include data on the offline network including user interactions with the offline network and advertising presented through the offline network. Typically, each individual advertisement is referred to as a "spot" or a "creative". Thus, the data that can be obtained may come from the various channels or TV networks (e.g., ABC, CBS, NBC, HGTV, ESPN, Bravo, etc.). This data may include data on programming (e.g., shows and times of airing in various markets), program demographics, times creatives were aired, pricing of air time, or the like. Certain device manufacturers of connectivity providers (e.g., internet service providers or cable providers) may also obtain or collect data on user interactions with the offline network or programs or creatives airing thereon. For example, many "smart" TVs, digital video recorders (DVRs) (e.g., TiVos) or the like may be connected both to the offline network and the online network. These devices may thus collect data on user's viewing, including what programs or TV channels were watched at what times, what programs were recorded, what programs (or portions thereof) were fast forwarded through or other data. This data can be reported back to the manufacturers or connectivity providers who may, in turn, provide such data to the quantification system. Moreover, because such data has been reported from a "smart" device that has connectivity to the online network, the IP address of the user on whom such data was collected may also be reported or associated with such data.

The quantification system may thus obtain these types (or a wide variety of other types) of data, on user's interactions with the offline network (e.g., what they saw or watched and when), what programs were aired on what channels at what time, what creatives were aired on what channels and at what time, who (e.g., what IP addresses) saw those creatives, who visited the retailer's online presence, who made a purchase, installed an application, etc., from the retailer's online presence or other data.

This data may be enhanced by the quantification system such that the quantification system may determine and store a set of enhanced data whereby the user's interactions with the offline network (e.g., their content viewing events in the offline network) may be associated with their interaction events with the online network, including a retailer's (e.g., associated with one or more creatives) presence in the online network. This enhancement may occur using the IP addresses of the event data from the retailer's online presence and the IP address of the user's interactions with the offline network (e.g., as determined from the user's "smart" device used to access the offline network) such that the user's online interactions can be correlated or otherwise associated with the user's interaction with the offline network.

The quantification system can thus determine which users viewed what programs and creatives and subsequently accessed the retailer's online sites, made purchases (including app installs) from the retailer's online presence or other data. This data can be used by the quantification system to calculate one or more metrics associated with both a creative or group of creatives aired by the retailer on the offline network and the retailer's presence on the online network. These metrics may include efficiency, relative performance, response, conversion rate, spend per conversion, or other metrics. These metrics, or data determined therefrom, can be displayed to a user accessing the quantification system in an intuitive interface to allow the user to assess the efficacy or other insights into the retailer's creatives.

Figure 1B:
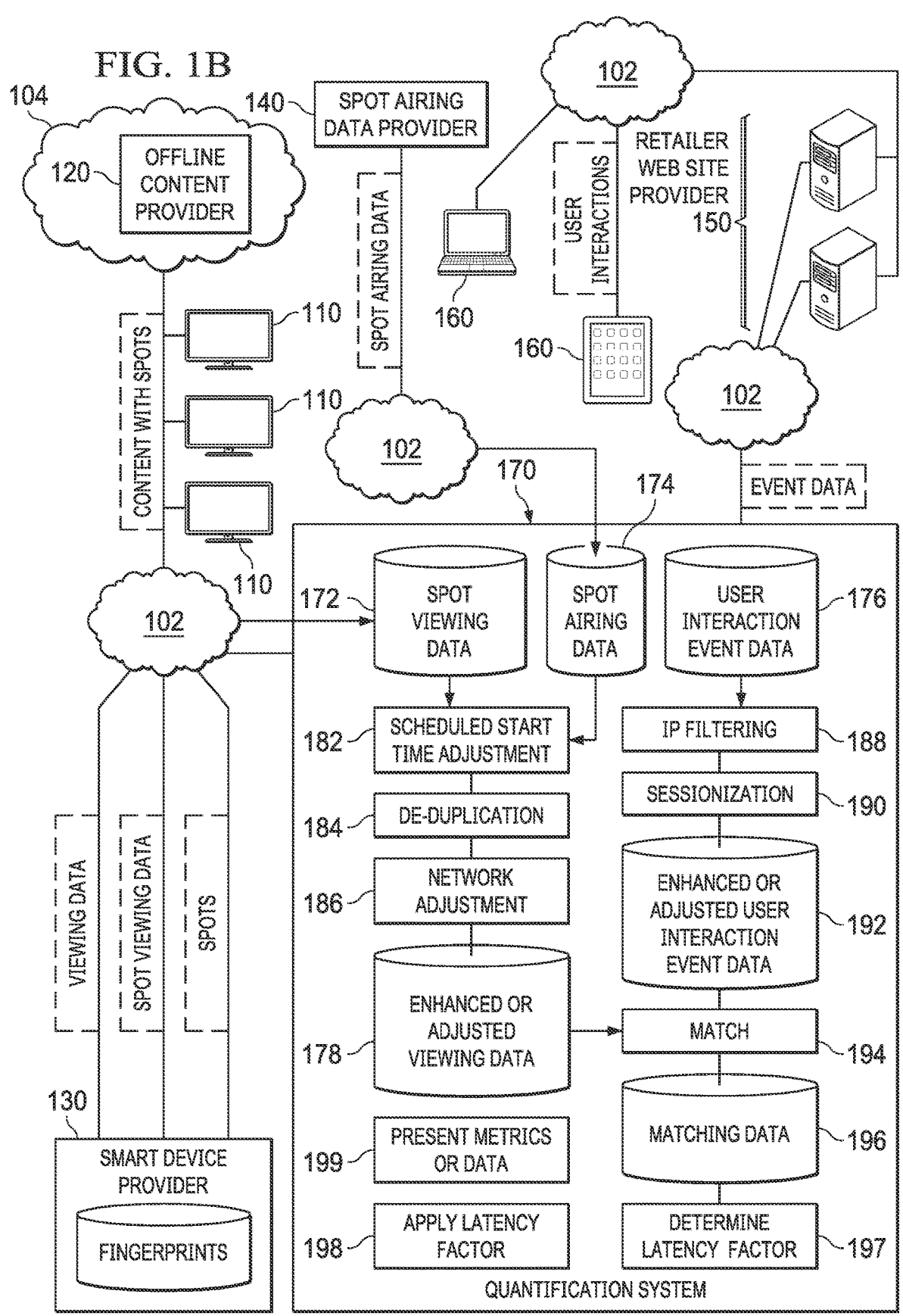
FIG. 1B is a diagram of one embodiment of networked environment for a quantification system.

It may be useful here to have an understanding of embodiments to illustrate an example distributed and networked environment that include an embodiment of such a quantification system. Moving to FIG. 1B, as discussed, offline content providers may provide content (e.g., television programs, movies, videos, audio or music content, etc.) to viewers at their devices 110 (e.g., televisions, radios or other viewing or listening devices) over an offline network 104. An offline networks 104 may usually be a traditional distribution networks such as television (TV) (whether transmitted, cable or computer network based) or radio (e.g., again, transmitted, satellite or computer network based). It will be understood, however, that though network 104 is referred to as "offline" network and may be a traditional distribution network, the "offline network" or, portions thereof, may also be, or include, an online network (e.g., the Internet, an internet, a local area network (LAN), a wide area network (WAN), or the like), as will be understood. For example, offline content providers 120 may include content providers such as Hulu, Amazon, YouTube, Netflix or other "streaming services" that provide content over an online network that may also be, or has typically been, provided over a traditional distribution network.

For example, offline data can be obtained from or provided by TV networks. Prelogs and postlogs are TV network airing logs. "Prelog" refers to the planned schedule of TV spot purchases for the client by network, date, and time that is identified in advance of the airing. "Postlog" refers to the actual times when spots aired on TV networks. Rates are how much the TV networks charge for commercial spots placed at various times of the day. Likewise, spot airing data, program schedules, and program demographics can be obtained or provided by TV networks or media agencies.

Online data can be obtained from or provided by data providers. These can include clickstream data from a data analytics provider which can include the number of unique visitors (UVs) for a website, the number of applications (apps) downloaded from an electronic site or store, the number of purchases made on a website or app (e.g., conversions), etc. Online data can be collected from a variety of sources, including websites, digital devices, consumer electronics, etc.

The offline data and online data collected at the quantification system can be processed so that they are merged temporally or in another manner to determine an account (e.g., minute-by-minute account of what is occurring in both the offline world and the online world. As an example, a graph generated based on TV viewership (offline data) can be overlaid on top of another graph generated based on UVs for a website (online data) and presented to a user over the Internet through a user interface running on the user's device.

It may now be useful to describe the operation of such quantification systems 170 and the networked environment in which they operate in more detail. Devices 110 may collect viewing data on what content the users of those devices 110 are viewing. As noted, certain device manufacturers or connectivity providers (e.g., internet service providers or cable providers) may obtain or collect user viewing data on user interactions with the content (e.g., programs or creatines airing thereon) provided by the offline content provider 120. For example, many "smart" TVs, digital video recorders (DVRs) (e.g., TiVos) or the like may be connected both to the offline network 104 and an online network 102. These devices 110 may thus collect viewing data on user's viewing, including what programs or TV channels were watched at what times, what programs were recorded, what programs (or portions thereof) were fast forwarded through or other data.

This viewing data can be reported back to the smart device provider 130 providers who may, in turn, provide such data to the quantification system 170 (e.g., over online network 102). Moreover, because such data has been reported from a "smart" device that has connectivity to the online network 102, the IP address of the user on whom such data was collected may also be reported or associated with such data.

Specifically, in one embodiment, a smart device 110 may fingerprint (e.g., hash) the content being displayed on the screen of the device 110 and report these fingerprints, an associated time of viewing, an identifier for the device 110, an IP address associated with the device on online network 102 or other viewing data to the smart device provider 130. At some point quantification system 170 may provide the spots being aired by offline content providers 120 (e.g., the actual content of those spots) to smart device provider 130. The smart device provider 130 may thus fingerprint these provided spots in the same or a similar manner to the fingerprints generated by the devices 110.

Accordingly, when the viewing data is received by the smart device provider 130 from the devices 110, the smart device provider may be able to determine from the fingerprints of the viewing data and the associated time of viewing (or timestamp) which spot was viewed on what device at what time. This spot viewing data 172 (e.g., an identifier of the spot was viewed, the time of viewing, a start time of the content (e.g., program) in which the spot was included, the identifier of the device, an IP address for the device, or other spot viewing data) may be provided by the smart device provider 130 at some interval to the quantification system 170 (or the quantification system 170 may request and receive such data, etc.) where it is stored at the quantification system 170.

Specifically, in one embodiment, spot viewing data may include content data or IP that contains details about content (e.g., network, show, or time) that devices 110 are displaying. Delayed viewing may be captured by comparing Scheduled Start Time and Content Recognition Start Time. A commercial IP that may contains details about which creatines (e.g., a spot identifier, or spot_id) were detected on devices 110 at what time, and during which content. An IP age may contain details about which IP addresses were in use by which device 110, and during what time period. Other data is possible and is fully contemplated herein.

Moreover, in certain embodiments, the quantification system 170 may initially enhance such spot viewing data 172 when it is received. For example, the spot viewing data 172 may be enhanced as follows: where #delay in the following example, refers to the difference between Scheduled Start Time and Content Recognition Time:

---
df['recognition_delay']
 = (df_recognition_start_time − df.content_start_media_time_millis)
 − df.scheduled_start_time;
df['delay_min'] = (df.recognition_delay.astype('timedelta64[m]')
---

Here, spot_recognition_start_time-spot detection_start_millis gives the approximate actual spot start time and ---
df['spot_start_time']
 = (df.spot_recognition_start_time
 − df.spot_detection_start_millis.astype('timedelta64[ms]')
--- should (e.g., approximately) match spot.dt for both delayed and live views and

---
df['scheduled_spot_time'] = df.spot_start_time − df.recognition_delay
---

As may be realized, for a variety of reasons this spot viewing data 172 may be somewhat incongruent with the spots as provided in association with the content provided by the offline content provider 120. One of the biggest problems is that the timing of the viewing of a spot may be completely divorced from the time the spot was originally aired (e.g., broadcast over the air or a cable network by the offline content provider 120). In particular, the increasing prevalence of digital video recorders (DVRs such as Tivos or the like) has allowed content to be viewed at almost any time desired, and the viewing of that content to be paused or otherwise manipulated during viewing. Moreover, the timing of the viewing of the spot may not correlate with the airing time of the spot because of other factor such as time zone differences or biases or the inability to correctly identify a spot or a wide variety of other reasons.

It is thus desirable for a variety of reasons to enhance or adjust the spot viewing data 172 as reported from the smart device provider 130 to determine that the spot viewing data is associated with the correct time at which the spot actually aired (e.g., by offline content provider 120) and is associated with the correct spot.

Accordingly, in one embodiment, quantification system 170 may also receive spot airing data 174 from spot airing data provider 140 over the online network 102. This spot airing data 174 may be a file identifying a set of instances of spot airings, where each instance includes an identifier for a spot, a time of airing, and a network (or other offline content provider identifier) on which the spot was aired. Spot airing data provider 140 may be, for example, a market research firm such as Kantar or the like.

Thus, once the spot viewing data 172 and the spot airing data 174 are received or obtained by the quantification system 170. The spot viewing data may be enhanced or adjusted using the spot airing data 174 to obtain the enhanced and adjusted viewing data 178. In one embodiment, the scheduled start time (e.g., associated with the spot viewing data) may first be adjusted (STEP 182). Such an analysis may be performed over a sets of the spot viewing data 172 where a discrepancy has been determined.

The first step here may be to aggregate the spot viewing data at a segment level. This may be aggregating spot viewing data at a network level or geographic level. All data is grouped together to create a histogram by delay time in relation to a time when content was supposed to have aired. So such a histogram is number of users (y axis) vs. delay time (e.g., x axis). If a periodicity in spikes is determined these spikes can be analyzed at more granular level (e.g., by geography). Once networks or geographies have been identified a scheduled start time can be adjusted to time shift particular period of times "back to zero". By correcting the scheduled start time of the content which was being viewed, this may allow similar shifting of the actual airing time of the spot so that it can be better aligned or matched with the spot airing data 174 as will be discussed in more detail.

Figure 8:
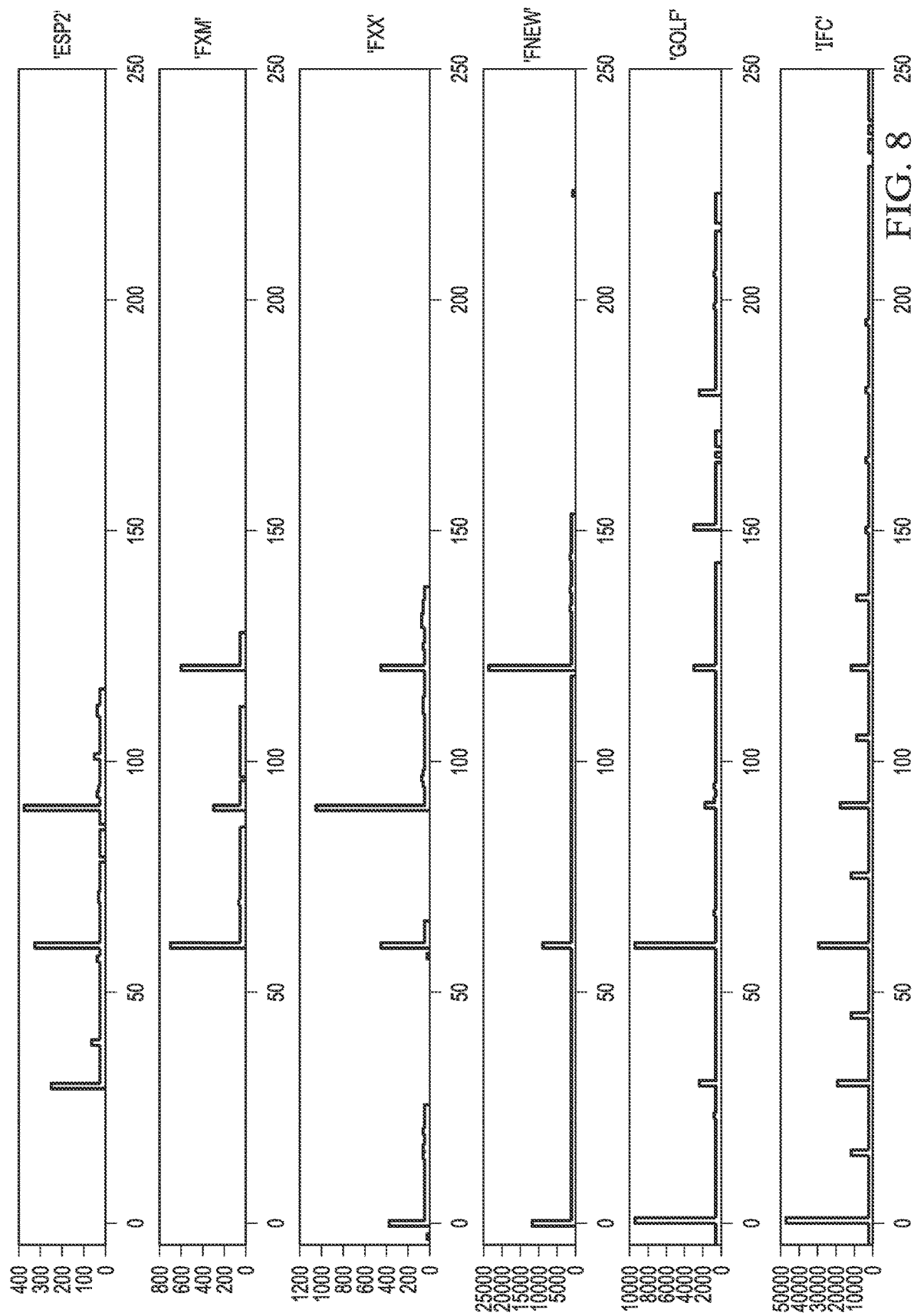
FIG. 8 is a diagram of one embodiment of a representation of a histogram associated with scheduled start time adjustment.

With reference briefly to FIG. 8, in one embodiment, due to incorrect geographic data (or other causes) it is difficult to adjust easily the Scheduled Start Time from East Coast to Local Time (which is reflected in Content Recognition Start Time). From the examples in FIG. 8 it can be seen that the difference between Content Recognition and Scheduled Start Times (e.g., delay minutes or delay_min) tends to follow clean hourly or half-hourly intervals (due to geographic location relative to East Coast), though certain network may be different.

Thus, in one embodiment, to determine if a scheduled start time should be adjusted, the quantification system 170 may loop through all networks, and all delay_minutes that are a multiple of 30 in spot viewing data 172. The relative size of the initial minute to each of the 30-minute intervals for each network may be determined and if the delayed spike is more than 2% of the initial minute, the Scheduled Start Time of associated instances of the spot viewing data may be adjusted by adding delay_min for data in the 5 minute interval [delay_minute, delay_minute+5).

In certain embodiments, there may be networks or channels where all viewership is delayed (i.e., initial minute size==0), so the relative size of the delayed spike is ∞. All of these delayed spikes may be included in the adjustment.

This scheduled start time adjustment may have the effect of pulling those delayed spikes back to the origin, where they would have been if correctly identified as live views. It may also have the effect of pulling back a small amount of actually delayed viewership as if it were live.

Accordingly, such scheduled start time adjustment may enhance the spot viewing data 172 through the creation of new fields, where corrected start time is the adjusted Scheduled Start Time:

```
df.loc[:, 'corrected_delay']
   = (df.content_recognition_start_time)
   - df.content_start_media_time_millis) - df.corrected_start_time
df.loc[:, 'corrected_delay_min'] =
df.corrected_delay.astype('timedelta64[m]')
```

Returning then to FIG. 1B, the spot viewing data 172 may also be de-duplicated (STEP 184). It may be understood that the fingerprinting done by the devices 110 or smart device provider 130 may not be perfect. Moreover, often times enterprises (e.g., retailers or the like) may air spots to test different (but very similar) creatines. Thus, the fingerprint may misidentify the spots watched on devices 110. Accordingly, spot viewing data 172 may include duplicative entries. Based on the spot airing data 174 the instance of the spot viewing data 172 corresponding to the actual spot aired on the network at that time may be identified using the spot airing data 174 and the duplicative entries removed or merged with the identified correct entry.

Specifically, instances of spot viewing data 172 corresponding to the same device 110 viewing a spot (e.g., on the same network or in association with the same content being viewed) at the same time (or within some tolerance of the same time), may be de-duplicated by determining the actual spot that was airing on that network at the time from the spot airing data 174 and merging or removing the duplicative entries. It will be noted, that this de-duplication (STEP 184) may be performed as part of the joining of spot viewing data 172 and spot airing data 174 as discussed below.

Network adjustment of the networks of the spot viewing data 172 may also be performed (STEP 186). In some cases, the smart device provider 130 may only track certain data from certain geographic areas (e.g., the top 50 designated market areas (DMAs)) and only for certain offline content providers 120 (e.g., certain channels such as the top 300). Accordingly, if spot viewing data 172 can't be matched to a particular network it may be determined that the instance of a viewing of a spot may correspond to a view of that spot when the spot was aired (e.g., is a "live" viewing of the spot).

In this manner, based on the identity of the spot it can be matched to a corresponding instance of that spot airing at that time in spot airing data 174 (e.g., based on the identifier of the spot) and the corresponding network on which the spot aired assigned to that instance of the spot viewing data 172. Additionally, mapping between local affiliates and parent networks may also be performed at this step. Certain channels as included in the spot viewing data 172 may be identify by local call signs (e.g., KXAN) and based on a database, that correlates local affiliates with nationwide networks, the proper nationwide network (e.g., ABC, CBS, NBC, etc.) assigned to instance of spot viewing data 172.

Each instance of the spot viewing data 172 can then be identified with a corresponding instance of the airing of a spot as included in the spot airing data 174. Such a merging may be done by performing a join between the instance of the spot viewing data 172 and the spot airing data 174 based on a network associated with each instance and a spot identifier. The closest matches may be kept where the spot viewing time within the spot viewing data 172 and the spot airing data are within some tolerance (e.g., 15 seconds or the like).

Accordingly, the spot viewing data 172 may be enhanced or adjusted and this enhanced or adjusted viewing data 178 stored at the quantification system 170. Similarly, the user interaction event data 176 received at the quantification system 170 may likewise be enhanced or adjusted. This user interaction event data 176 may include data on a retailer's site such as event data associated with user views of the retailer's website, application installs, product purchases, time spent on the retailer's site or a wide variety of other data (including analytics data) associated with a user interaction with the retailer's site (or application, which collectively will be understood to be referred to when a retailer's site or online presence is discussed). Such data is usually associated with an IP address of the user's device used to access the retailer's online presence and a time stamp or time window.

Initially, this user interaction event data 176 may be IP filtered (STEP 188). This IP filtering may include the removal of event data 176 associated with any IP address known to be a bad or malicious IP address or that has a volume of traffic that may indicate that the IP address is a bot or is associated with development or testing of the retailer's site. Multiple sessions or events associated with a similar IP address or subnets of an IP address may also be excluded or consolidated.

The user interaction event data 176 may also be sessionized (STEP 190). As discussed, the user events in the user interaction event data 176 may have associated time stamps. This data may be, for example, clickstream data with associated IP addresses and one or more events.

Accordingly these events may be grouped into sessions by the quantification system 170. The sessions into which the event data 176 may be grouped may be different than sessions as defined by the retailers or other entities and may utilize different criteria or criteria specific to the quantification system 170. This sessionization may be based on one or more criteria, where these criteria may be related to the timing or proximity of timing of the events in the event data 176. Moreover, the set of criteria for a session may differ based upon the associated retailer site 150 on which the events 176 were collected. For example, a large retail site may have a short session period Accordingly, the enhanced and adjusted user interaction event data 192 may be grouped into sessions. Thus, for each retailer's site 150 there may be a set of associated sessions, each session comprising one or more user interaction events associated with an IP address of the device 160 interacting with the retailer's site 150 and an associated start time of the session.

At this point then, the enhanced or adjusted spot view data 176 may be matched with the enhanced or adjusted user interaction event data 192 to associate (if possible) a user's viewing of a spot with that user's interactions with the retailer's website 150 (STEP 194). Generally, this matching may be accomplished by matching the IP address associated with spot viewing data in the enhanced or adjusted viewing data 176 with the corresponding IP address of the enhanced or adjusted user interaction event data 192 to associate a user's viewing of a spot with a corresponding session with an associated retailer's site 150.

Accordingly, this may be a first merge step that is an exploded cross join between two data sets based on IP address matches. Any matches where the determined spot viewing time for a spot view in the enhanced or adjusted spot view data 176 occurs after the session start time as determined for a matching session in the enhanced or adjusted user interaction event data 192 may be discarded.

Next, in cases where there are still multiple matches between one or more spot views in the enhanced or adjusted spot view data 176 and one or more matching session in the enhanced or adjusted user interaction event data 192, the match may be kept between the matching session or event whose start time is closet in time to the spot viewing time of the matching spot viewing event of enhanced or adjusted spot view data 176. Thus, the matching spot view data and user interaction event data 196 may be stored at the quantification system 170.

This matching (or merged) data 196 and other data obtained or determined by the quantification system 170 may be utilized for a variety of purposes. For example, the matching data 196 can be used to establish a baseline of website visitor traffic. There can be many ways to establish such a baseline. For example, a website visitor traffic baseline can be established by taking a moving average of UVs to a website throughout the day or the week and excluding those that clearly do not come because of any TV spots (e.g., UVs that came to the website through a link in an email, through a referring website, etc.). This is referred to as a UV baseline and may be particular for TV conversion attribution computation (because it excludes non-TV influences). The UV baseline essentially plots, over the course of a timespan, what is considered normal website visitor traffic to a website relative to TV spots, as reflected in the number of UVs to the website.

Different TV spots may contain different messages to TV viewers. For instance, some TV spots may be directed to a physical product, while some TV spots may be directed to a new app install. For the purpose of illustration, suppose a TV spot calls for viewers taking a certain action through a particular website (e.g., visit a website, buy a product through the website, download and install an app from the website, etc.), a "conversion" event occurs when a UV to the particular website takes that action (e.g., the UV visited the website, the UV purchased the product through the website, the UV downloaded and installed the app through the website, etc.). Such conversions can be considered as a conversion lift.

"Lift" is a quality metric for measuring a spot in the context of a particular type of campaign. Since the merged data contains the time period by time period (e.g., minute-by-minute) cohort (i.e., all the UVs to the website during the same minute), the quantification system can calculate a conversion rate based on the cohort and determine the visitor lift relative to the UV baseline. In some embodiments, this can be done by examining every minute in a day for a number of days during which offline data and online data have been aggregated and merged with regard to a particular website and computing a conversion rate for each minute. Thus, the conversion rate during a time window for a particular TV spot may be isolated.

Because the cohort based on which the conversion rate is calculate may include both TV viewers and non-TV viewers, the initial result from this calculation can be skewed. For example, suppose a spot aired on a TV network at 6:20 PM and a lift (an increase in the conversion rate) occurred shortly after 6:20 PM, it is possible that the lift can be attributed to the spot that aired at 6:20 PM. However, it is unclear how much of that lift can actually be attributed to the spot that aired at 6:20 PM.

One way to eliminate this skew and quantify the attribution of such a lift to TV conversion is to examine session timestamps, correlate session timestamps to spot airing data, and assign a timestamp to a conversion event that occurred on a website. This can be done by examining every minute of every UV's visit to the website within a window of time when a spot aired on a TV network. Following the above example in which the spot aired on a TV network at 6:20 PM, the quantification system may operate to examine UV sessions initiated at the website within a time window (e.g., five minute) starting at 6:20 PM; thus 6:20 PM, 6:21 PM, 6:23 PM, 6:24 PM, and 6:25 PM.

The quantification system may track each UV session and determine whether a conversion occurs during a UV session. If a conversion occurs during a UV session (a conversion event), the quantification system may assign the start of the UV session as a timestamp associated with the conversion event. For example, suppose the spot aired on a TV network at 6:20 PM on Day One with a message for viewers to donate to a charity. A UV initiated a session with the charity's website at 6:25 PM on Day One and subsequently made a donation (e.g., a hour, a day, or even a week later).

In this example, the quantification system may assign 6:25 PM on Day One as the timestamp for the conversion event. In some embodiments, if there is a time gap between visits by the same UV to the website, the quantification system may use the latest (active) session timestamp as the timestamp for a conversion event. That is, if there are multiple sessions, the quantification system may select the most recent one if the most recent one and the one before it has a temporal gap that is larger than a predetermined threshold (e.g., three months, six months, one year, etc.). This conversion event timestamp assignment is irrespective of the spot airing date/time.

Now that each conversion event has an assigned timestamp, the quantification system 170 may operate to determine conversion rates of UVs to a website during a time window defined relative to a spot airing time. The quantification system may keep data for every UV to a particular website (from the online data), documenting when UVs visit the website, when their sessions started, and when or if a conversion event took place. The quantification system can compare, on a minute by minute basis, user interactions with the website relative to when a sport aired (e.g., at 6:25 PM). Using a fixed window (e.g., five minutes for this website), anything occurred during 6:22-6:27 PM, the quantification system can determine how UVs visited the website in that window of time and how many conversion events have taken place in that window of time. This gives an overall conversion rate in the TV window (which includes both TV responders and non-TV responders). Suppose the total of UVs is 100 UVs to the website over the five-minute window, and 10 of them made a purchase. This results in a 10% conversion rate in general for that window. This can be defined as follows:

> Conversion rate=number of conversions that occurred as a result of UVs that started their session within a time window/number of UVs within the time window.

The quantification system 170 then determines how much of this conversion rate can be attributed to TV (i.e., the conversion rate of TV responders). In some embodiments, this can be done by isolating the lift from TV on a minute by minute basis, applying a new alpha factor (a), and adjusting the conversion rate using the alpha factor. In this disclosure, the alpha factor represents a ratio between the conversion rate of TV UVs and the conversion rate of non-TV UVs.

As discussed above, a lift has been computed and associated with each minute the quantification system has data for a website (e.g., every minute across all the days and months running a campaign). Also assigned to each minute is a percentage of lift that came from immediate TV responders, from 0 to 100%. Below is an example of how this percentage can be determined.

Suppose the quantification system 170 has computed the total conversion rate (e.g., the number of conversion events divided by the number of UVs per minute). When the percentage of TV users is 0, the conversion rate is 2%. When the percentage of TV users is 100, the conversion rate is 1%. Therefore, in this example, the TV users have half the conversion rate in general than the non-TV users. This ratio is represented by the alpha factor. The alpha factor can be determined using an ordinary least squares (OLS) regression technique as follows:

$$y = \alpha_0 + \alpha X + \varepsilon,$$

where y=vector of conversion rates by minute and X=vector of % TV users (lift/UV) per minute.

That is, the quantification system 170 examines the percentage of TV users for each of those minutes and solves what that alpha factor is at 100% TV lift to 0 TV lift.

Once the alpha factor is determined, the conversion rate for TV responders can be determined by multiplying the number of conversions by a factor lambda ($\lambda$). This is reflected in the new equation below:

$$\text{conv rate}(tv) = r(tv) = \sum_t \frac{\lambda_t c_t}{m_t},$$

where $$\lambda = \frac{\alpha p}{\alpha p + (1 - p)},$$

m=lift, and
p=likelihood of user being from $$tv = \frac{\text{lift}}{UV}$$

for that minute,
α=ratio of tv conversion rate to nontv conversion rate,

By computing this equation, the quantification system 170 can determine the conversion that can be attributed to TV responders. That is, the quantification system 170 is operable to examine the total conversion rate relative to a specific lift, multiplying those conversions by the lambda factor, which is the alpha factor times p divided by the alpha factor times p plus one minus p. Put another way, the conversions tracked and ascribed to those users in a TV window cohort are adjusted by the proportion of TV viewer conversions responding in that window; (e.g., proportion of conversions associated with TV viewer lift divided by the proportion of conversions associated with TV viewer lift plus the proportion of conversions associated with non-TV viewers. This is the conversion rate of immediate TV responders.

The quantification system 170 may also use the matching data 196 for the determination of a latency factor (STEP 197). The determined latency factor can then be applied to a variety of metrics (e.g., the lift or conversion rate as discussed above) to adjust those metrics or determine new metrics of data (STEP 198). The metrics or data can then be presented in a user interface such as a dashboard for presentation on computing devices coupled to the quantification system 170 (STEP 199).

In particular, as has been discussed, data associated with event data from the retailer's online presence and the IP address of the user's interactions with the offline network (e.g., as determined from the user's "smart" device used to access the offline network) can be obtained or determined such that the user's online interactions (including interaction with a retailer's presence in the online network) can be correlated or otherwise associated with the user's interaction with the offline network.

This data can then be utilized for a variety of purposes and ends by quantification systems. As but one example, this data can be used by the quantification system to calculate one or more metrics associated with both a creative, or group of creatives, aired by the retailer on the offline network and the retailer's presence on the online network. These metrics may include efficiency, relative performance, lift or response, conversion rate, spend per conversion, or other metrics as discussed. These metrics, or data determined therefrom, can be displayed to a user accessing the quantification system in an intuitive interface to allow the user to assess the efficacy or other insights into the retailer's creatives.

There are, however, a number of difficulties that occur in determining such metrics. One such difficulty is the difficulty of measuring the latent effects (e.g., the effect after some time period) of the airing of a creative on one or more metrics, including metrics associated with a user's interactions with the retailer's online presence. This is because the retailer's online presence is almost always available to a user, thus a user may access the retailer's online presence directly after seeing a creative, or may wait some undetermined amount of time before accessing the retailer's online presence. Also, in many cases, offline content is accessed at different times than the original airing of the creative. For example, a user may record a TV program and watch that program (and any associated creatives) subsequently to the original time the program aired. That user may then access the retailer's online presence at some undetermined amount of time after the user watched the creative (which is also some undetermined amount of time after the creative actually aired).

It is thus desired to quantify metrics using a latency factor which may account for the effects of the airing of a creative that occur outside of some baseline window (e.g., time period, such as 5 minutes, 10 minutes, 30 minutes, etc.) following the original airing of the creative. Such a latency factor may be associated with, or otherwise reflect, an expected response to an airing of a spot outside of the bassline window (e.g., relative to a response within the baseline window) vis a vis the retailer's online presence. Thus, a latency factor can be applied to almost any other determined metric to estimate or adjust that metric to account for user's interactions that occur outside of the baseline window and within a selected time period (e.g., 30 days, 60 days, a quarter, a year, etc.).

By determining such a latency factor, users can access and determine the potential response from a creative more quickly, improving the computer performance by allowing metrics and other data to be determined more quickly and interfaces to be generated more quickly. It also can provide the capability of measuring delayed results on a granular level. Other approaches either will not be able to gauge the full response to an individual spot, or will only be able to estimate the full response on an aggregated level. Such a latency factor may be usefully applied to a number of metrics that may be determined by a quantification system, including for example traffic lift or conversion.

Turning first to an embodiment of determining a latency factor for traffic lift, some context may be useful. As explained above, and in more detail in U.S. patent application Ser. No. 16/365,448, filed Mar. 26, 2019, entitled "SYSTEMS AND METHODS FOR ATTRIBUTING TV CONVERSIONS" by Swinson et al. and U.S. patent application Ser. No. 16/360,456, filed Mar. 21, 2019, entitled "SYSTEMS AND METHODS FOR DEBIASING MEDIA CREATIVE EFFICIENCY," by Swinson et al., the entire contents are fully incorporated herein for all purposes, for the TV advertising industry, one embodiment may measure the metric of efficiency using traffic lift. Assuming t is the time (minute), and non-TV normal traffic is F(t). Once an ad is aired at t0, new traffic changes from F(t) into G(t), and a creative's contribution is the difference between G(t) and F(t).

One challenge in this calculation process is that only the real traffic (e.g., to a retailer's online presence such as a website) may be observed. For example, assume the creative (also referred to as an ad, spot or advertisement) is aired at t0. Before t0, the traffic observed is F(t) (t<t0); after t0, the traffic observed is G(t) (t>=t0), however, no F(t) (t>=t0) can be observed. Due to the fact that the traffic is usually a stochastic process with random noise, and also many TV spots may have aired at similar times, estimating F(t) (t>=t0) directly is usually an incredibly difficult, if not impossible, task.

Figure 2A:
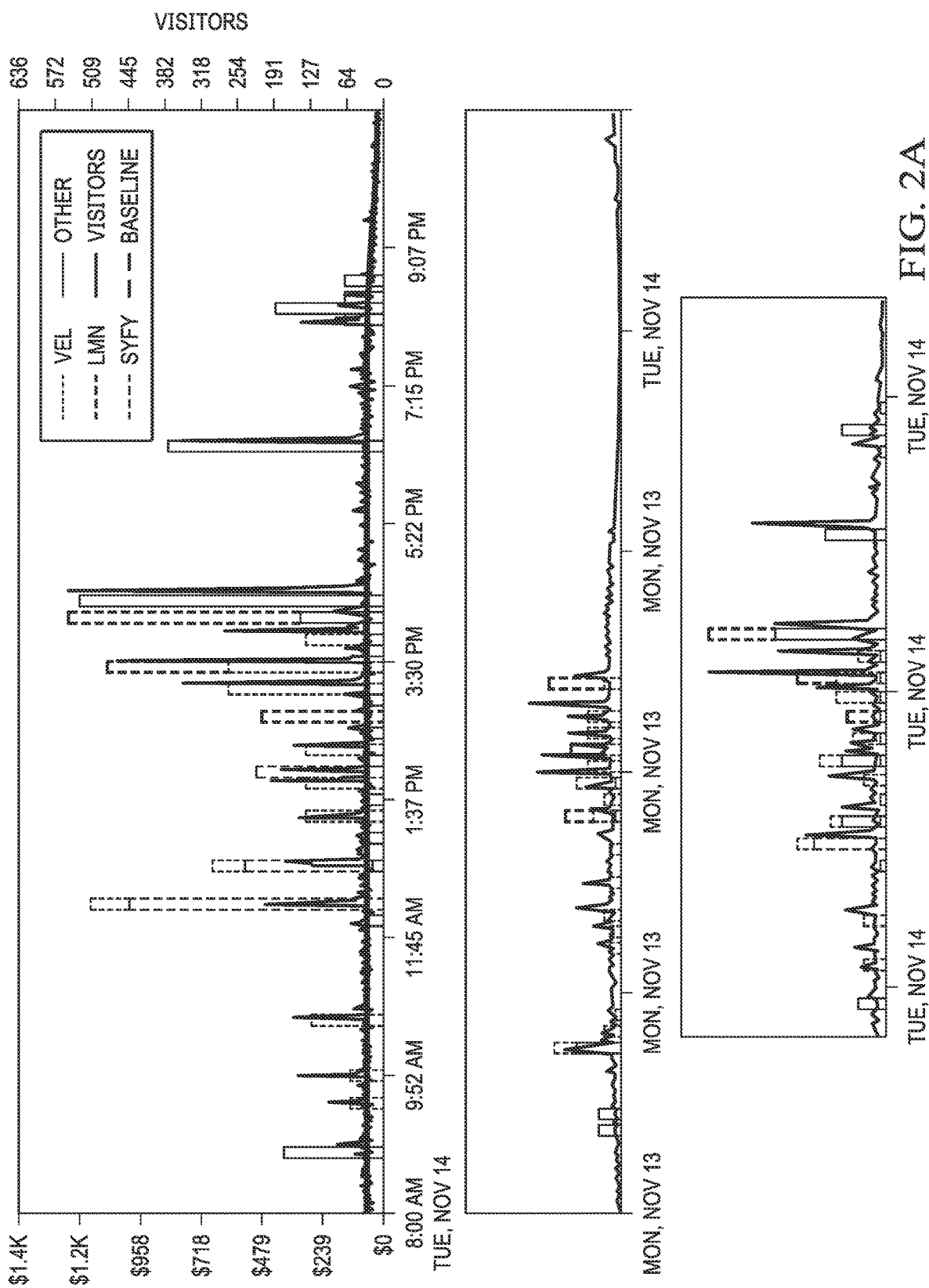
FIGS. 2A and 2B are a diagram of one embodiment of an interface for presenting response to creatines.
Figure 2B:
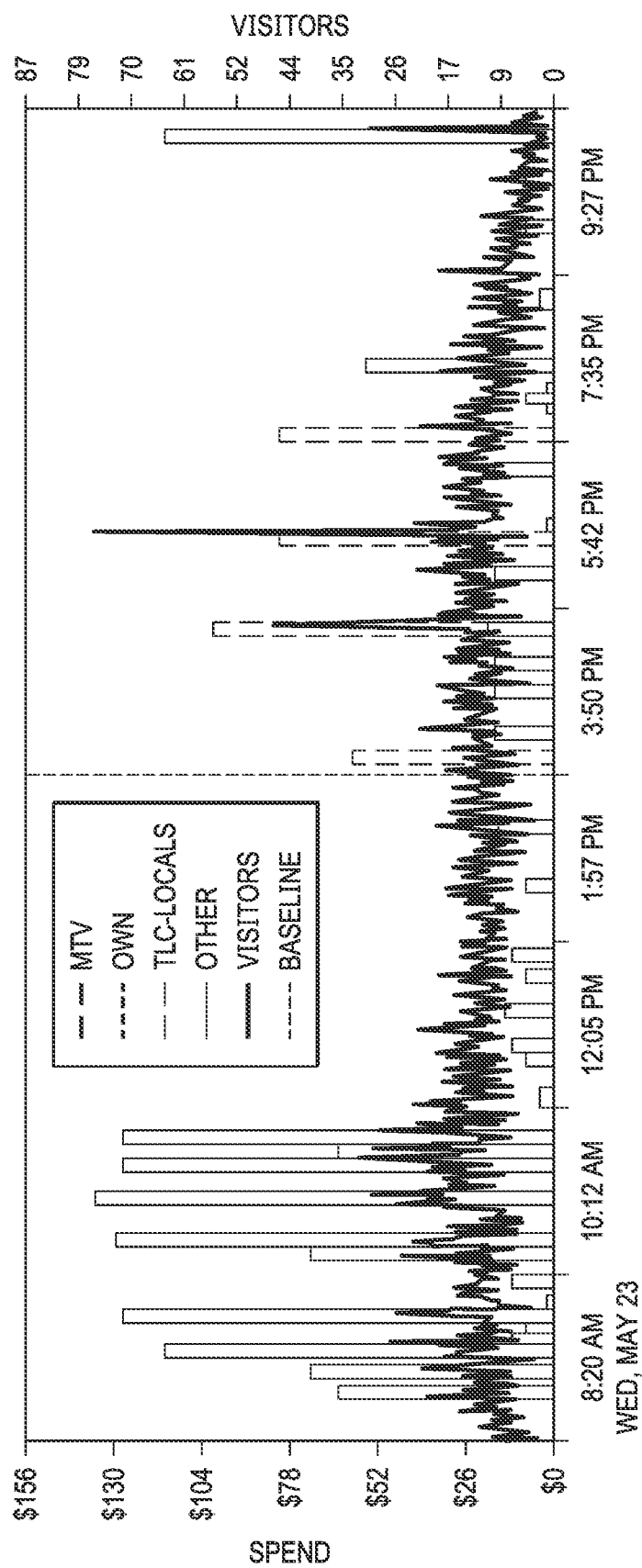

Meanwhile, it is observed that there is usually a strong traffic spike following a creative airing (usually within 5 or 10 minutes), which creates an opportunity to use immediate lift in traffic to the retailer's online presence to estimate or determine efficiency for the creative. This becomes a standard in embodiments to measure creative efficiency. The "immediate lift" approach to embodiments leverages a smoothing algorithm to create a baseline, which mimics the F(t) before and after the airing, and the spike area above the baseline will be considered the contribution to the traffic from the creative. One embodiment of an interface graphically depicting a relationship between the spike in traffic on a retailer's site and the airing of creatines on various TV networks (e.g., VEL, LMN, SYFY) is depicted in FIGS. 2A and 2B.

Such an approach is useful in embodiments, with a caveat: the long term (or latent) TV advertising effect is ignored with this method, because it factors into the baseline. Since TV creatives usually create an impression over a product that can drive people to visit a website or install an app long after they viewed the ads, such long term effect should not be ignored and needs to be considered when measuring TV efficiency.

Figure 3:
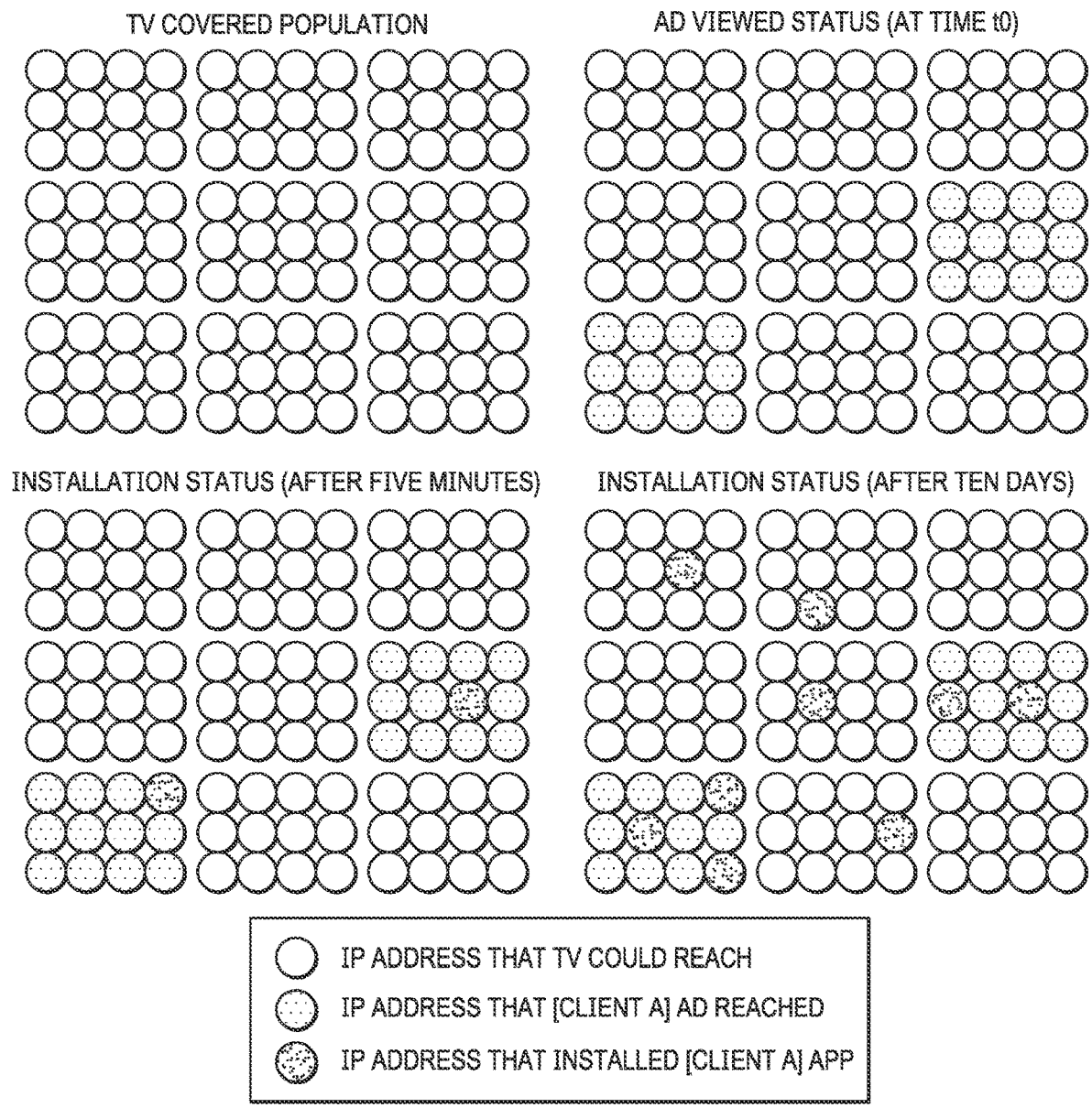
FIG. 3 is a block diagram for an example utilized in the disclosure.

Referring to FIG. 3, as an example, embodiments of quantification systems may track viewers of a retailer's ad via IP addresses, as discussed. In the following example, there are 12*9=108 IPs reachable via TV, 12*2=24 IPs have viewed [retailer A] ad. Within the following 5 minutes, there are 2 IPs with [client A] app download (e.g., access to retailer's online presence); all of those are within IPs who viewed [client A] ad. Now, the immediate lift is 2 installations (e.g., access to the online presence) for this ad, comparing with no ad.

However, after 10 days, naturally, IPs without ad impressions may also install the app (e.g., here assume 4 out of 84), while those with ad impressions have 5 out of 24 installed the app. The real value or metric measuring the efficiency or lift created by the TV ad is thus (5/24−4/84)*24=3.86. In this example, the latency factor may be 3.86/2=1.93 for [client A] ad efficiency.

More generally, then, embodiments of this methodology are used by embodiments of a quantification system to estimate the latency factor of a retailer's creatives. In particular, certain embodiments of quantification systems may leverage rich data sets (TV viewing and retailer's online access data (e.g., app install data) and statistics (e.g., conditional probability distribution with or without bootstrapping sampling (as will be discussed)), to determine a latency factor to help retailers and associated creators of creatines better understand the efficiency or efficacy of their advertising.

Figure 4:
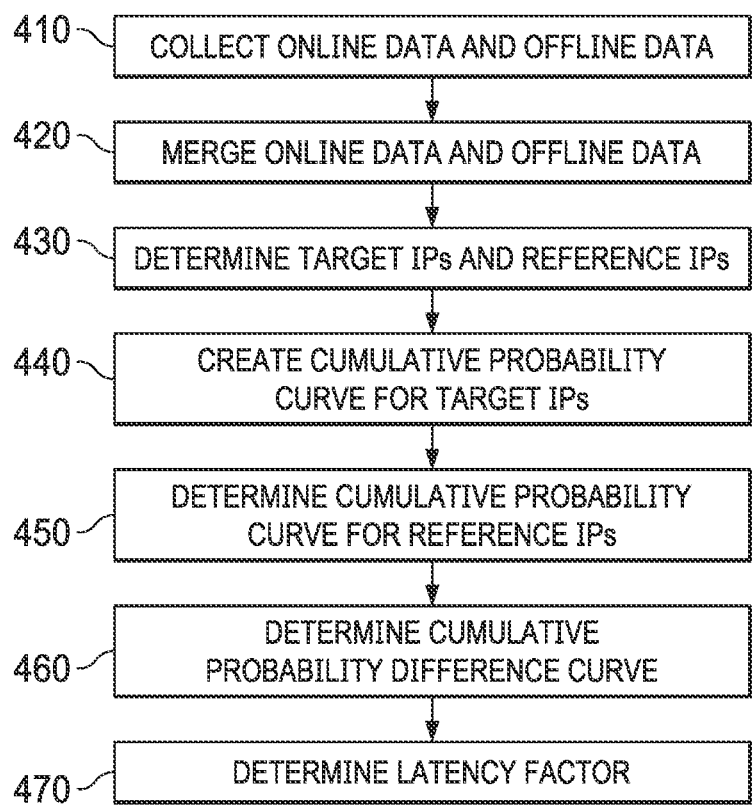
FIG. 4 is a flow diagram for one embodiment of a determining a latency factor.

Looking at FIG. 4 then, a flow diagram for one embodiment of a method for determining a latency factor that may be employed by a quantification system is depicted. As discussed above, the quantification system may obtain data from a variety of sources and merge or match such data (STEPS 410, 420). Certain embodiments may utilize three types of data to determine the latency factor of TV advertising for any given product, application, retailer, etc. 1. TV ad spot airing information (date/time, station, content), 2. TV viewership data with IP addresses or device identifiers (ids), and 3. Clickstream data: app-install or web-browsing activities with associated IP addresses or device ids. Note here that for simplicity purpose in explaining certain embodiments, application installs may be the metric or factor utilized as an example with IP addresses as the matchkey between data from different sources. It will be noted that web-browsing or user view or other latency factors can be determined in a similar manner. Other data may also be used to correlate or associate data from different sources, including device ids for user's other devices or other data.

In any event, from enhanced data at the quantification system, the following information can be determined by matching or merging online and offline data: whether an IP address was exposed to the specific advertisement and whether this IP has installed the application. Ideally, each IP address will be associated with only one device (with application download activity); however, in reality, there are cases in which multiple devices are associated with one IP. In one embodiment, the data sets collected or determined have the following structure, for each specific client:

| IP address | Client | last_view_time | app_install_time | multiplicity |
|---|---|---|---|---|
| 0.0.0.0 | A | 2017 Jul. 1 00:00:00 | N/A | N/A |
| 0.0.0.1 | B | 2017 Jul. 1 01:00:00 | 2017 Jul. 1 01:03:00 | 1 |
| 0.0.0.1 | A | 2017 Jul. 1 02:00:00 | 2017 Jul. 1 02:10:00 | 4 |

Here, if one IP address has no app installation, then the last_view_time is the last time an ad was aired and viewed by that IP address; if one IP address has one app installation, then the last_view_time is the previous time an ad was aired and viewed by that IP address; if one IP address has multiple app installations at different times, then the last_view_time is the previous time for each app installation when an ad was aired and viewed by that IP address. To avoid cases where a public IP is shared by multiple devices, a strict rule may be applied by the quantification system to remove those IPs with more than one app installation. This rule can be changed in other embodiments to a different threshold of app installation or device id combination per IP address. Effectively, the data becomes following:

| IP address | Client | last_view_time      | app_install_time    |
|------------|--------|---------------------|---------------------|
| 0.0.0.0    | A      | 2017 Jul. 1 00:00:00 | N/A                 |
| 0.0.0.1    | B      | 2017 Jul. 1 01:00:00 | 2017 Jul. 1 01:03:00 |

When the latency factor is evaluated for a retailer, for example [retailer A], IPs that viewed that retailer's [retailer A's] ad (or a particular one of that retailer's ads) are called Targeted IPs. Other IPs (e.g., IPs that did not view the retailer's ad or the particular retailer's ad), or a subset of other IPs, are called Reference IPs. A set of Target IPs and Reference IPs can thus be determined based on whether an IP has viewed the retailer's ad or a particular of the retailer's ad (STEP 430).

Embodiments may thus determine a conditional probability. While embodiments and examples have been discussed with respect to the installation of an application it will be noted that substantially similar embodiments may be equally effectively applied to views or access to retailer's online presence such as website views or conversions or purchases of items through such an online presence.

Since the determination of a latency factor will always be conducted on a specific date or time, it may not be possible to determine whether an IP will have any app-installs in the future (e.g., subsequently to the determination). So the max-time is defined as from the time an IP was exposed to this advertisement (t0), until now (tnow) when the most recent app installation data is collected):

$$t\,max = t now - t0$$

The individual (uniquely mapped to an IP address) can choose to install (e.g., the app or view the website) or not. If he still has not installed the app or viewed the website at $t_{now}$, the effective view time is $t_{now} - t_0$. If the individual has installed the app or viewed the website at $t_{install}$ (before $t_{now}$), then the effective view time is:

$$t install - t0.\ deff = \min(t now, t install) - t0$$

This is the effective duration after an ad has aired that a user has installed the app. The conditional probability for installation within a specific time range can be expressed as:

$$P(\text{install}|t0 <= t <= t1) = N\text{installed}/N\text{viewed}$$

How many installations happen by t1 (before $t_{now}$), after the ad was aired on t0 can then be evaluated. This is determined by:

$$P(\text{install}|t_0 <= t <= t_1) = \sum \frac{N(\text{install}|t_0 <= t <= t_1)}{N(\text{viewed}|t_0 <= t <= t_1)}$$

With the cumulative conditional probability, the percentage of TV viewers to install this app can then be determined, up to a specific time. Such a determination will be applied over Targeted IPs. Then, to remove organic installation, the same determination over Reference IPs can be determined and their cumulative conditional probability determined:

$$P(\text{install}|t0 <= t <= t1\ \&\ \text{noview})$$

where this population of users viewed another ad over the same time range, but did not view the retailer's ad.

The difference will be the incremental installation caused by this airing of the creative:

$$P\text{real}(\text{install}|t0 <= t <= t1) = P(\text{install}|t0 <= t <= t1\ \&\ \text{view}) - P(\text{install}|t0 <= t <= t1\ \&\ \text{noview})$$

Figure 5:
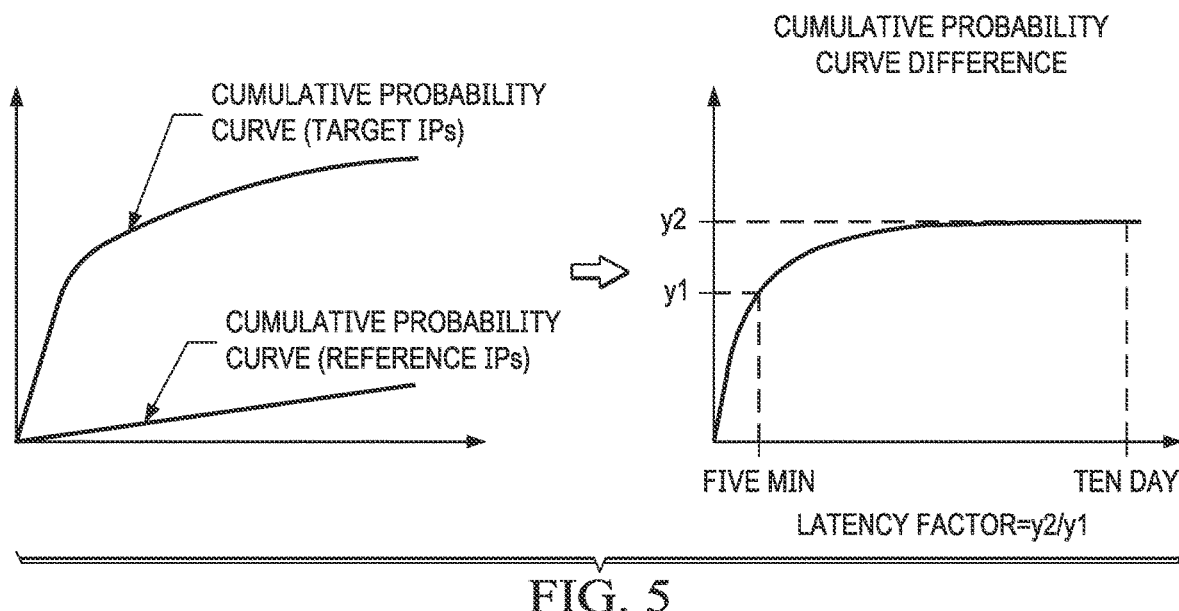
FIG. 5 is a diagram graphically depicting one embodiment of determining a latency factor.

This determination is expressed graphically in FIG. 5. Here, there are two different data sets. The Target IPs for a creative (or a set of creatives, type of creative, segment of a creative, creatives on a particular channel, etc.), are the set of IPs that responded (e.g., interacted with the retailer's online presence in a particular manner). From this set of Target IPs, some number responded during the baseline window (e.g., some amount of time after the airing of the creative, such as 5 minutes) while some number responded outside of the baseline window but within the time horizon or overall time window (e.g., 30 days). The data from these Target IPs can be used to create the cumulative probability curve for the Target IPs (STEP 440), where the X axis is the time since the creative aired and the Y axis is a percentage or ratio of those viewers who saw the ad that responded.

It will be noted that this Target IP curve may, in some embodiments, overestimate the response because some of those users would respond (e.g., access the retailer's online presence) regardless of their viewing of the creative. To control for this population, a set of Reference IPs may be used. These Reference IPs may be for users who saw creatines on similar or other networks at similar times and interacted with the retailer's online presence (e.g., responded). This will give an approximation of the users who would have responded in any event (e.g., without viewing the creative of interest).

Thus, from this set of Reference IPs, some number responded during the baseline window (e.g., some amount of time after the airing of the creative, such as 5 minutes), while some number responded outside of the baseline window but within the time horizon or overall time window (e.g., 10 days, 30 days, etc.). The data from these Reference IPs can be used to create the cumulative probability curve for the Reference IPs (STEP 450), where the X axis is the time since the creative aired and the Y axis is a percentage or ratio of those viewers that saw the creative that responded.

Figure 6:
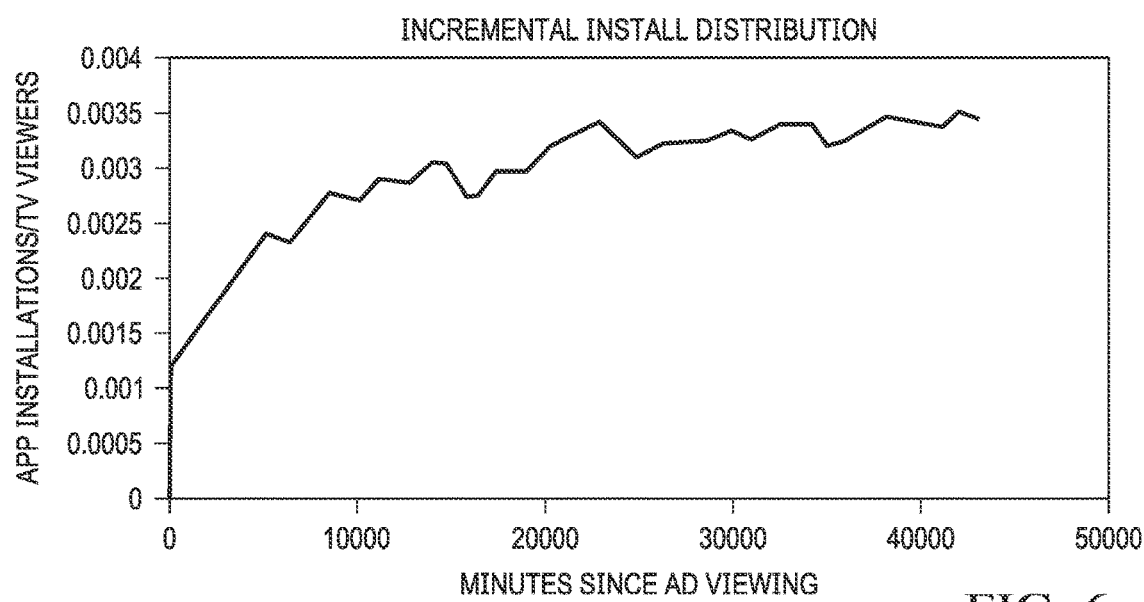
FIG. 6 is a diagram of one embodiment of an interface.
Figure 7:
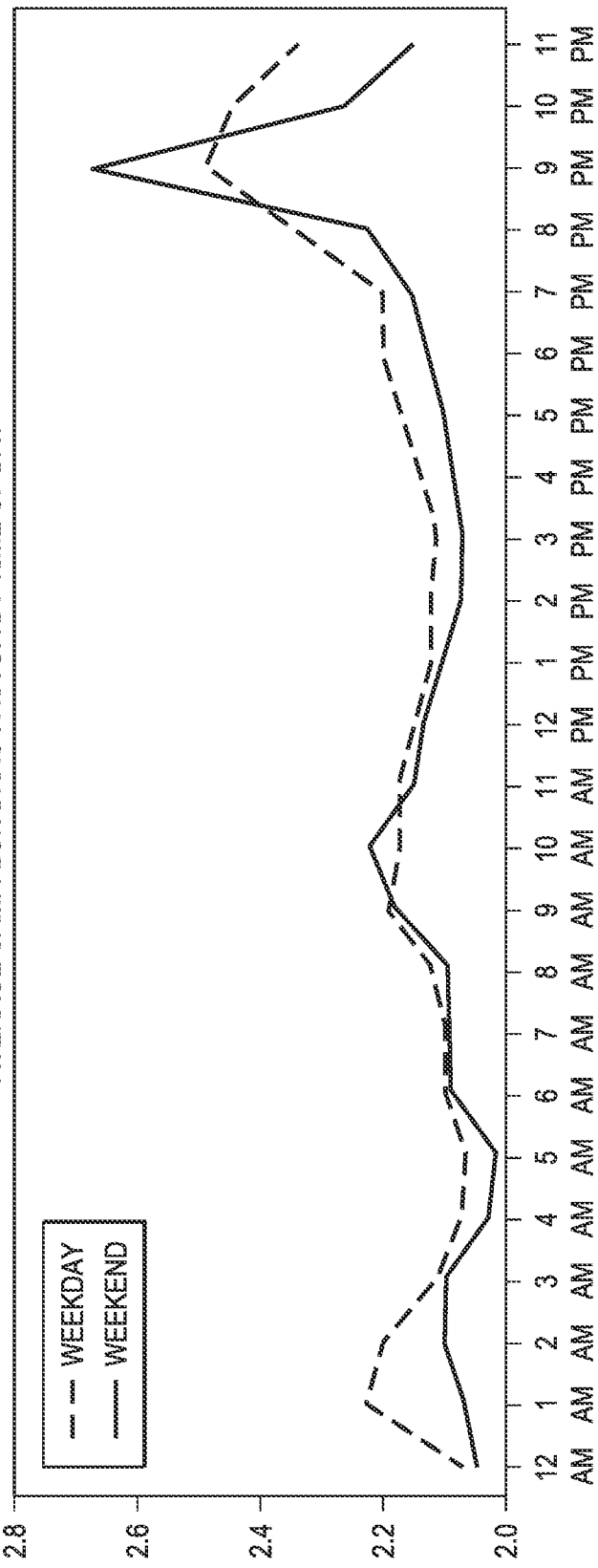
FIG. 7 is a diagram of one embodiment of an interface.

By subtracting the Reference IP curve from the Target IP curve, a cumulative probability difference curve can be determined (e.g., which accounts for those users who would have responded regardless of viewing of the creative) (STEP 460). The latency factor can then be determined from this cumulative probability difference curve (STEP 470) by dividing the response percentage, or number, at the expiration of the time of the baseline window (e.g., 5 minutes in the example) as determined from the cumulative probability difference curve by the response percentage or number at the end of the time horizon or overall window (e.g., in this example 10 days) as determined from cumulative probability difference curve. An example interface presenting an actual curve is depicted in FIGS. 5 and 6 along with an interface presenting the latency or drag (used interchangeably) for a creative in FIG. 7.

Once a latency factor is determined, this latency factor can then be applied to a metric such as immediate response to estimate or determine a value for a metric (e.g., unique visitors, application installs, etc.) over the time horizon of overall window. For example, if a latency factor is as computed above, an example might be:

$$\text{latency factor} = \frac{\text{total response}}{\text{immediate response}} = \frac{0.295\%}{0.133\%} = 2.22$$

This latency factor may inform a user such as a retailer how much additional delayed response they can expect (e.g., to their creative or at their online presence). In the above example, that delayed response is 1.22 times the (immediate response). So, basically:

delayed response=(latency factor−1)*immediate_response

So, in the case of measuring a lift in unique visitors to a website, it would be:

UV_lift_delayed=(latency factor−1)*UV_lift_immediate

Embodiments may assume that the metric (e.g., the app installation or website views) for both Target and Reference IPs have similar installation patterns across the day, so that the cumulative installation over the whole period time is comparable. However, it is possible that two groups have different installation patterns (different hours, different day of week, etc.), which will impact the two cumulative probability curves. This situation could be, for example, due to differences in the timing of creative viewership between the two samples (e.g., consumers viewing ads in the evening may be more likely to install an app or view a website).

To account for this possibility, in certain embodiments sampling via the bootstrap technique may be applied to the reference viewership population (e.g., Reference IPs) based on the retailer's viewership population, so that the reference retailer population per hour per day of week closely represents the same distribution as the targeted retailer population. In this way, no population bias will be introduced by individuals that viewed the retailer's ad compared with individuals that viewed ads other than the retailer's, and the comparison between the two populations (e.g., Target IPs and Reference IPs) is meaningful.

In other words, in some embodiments, the quantification system may create a sample set of Reference IPs (e.g., DF_REF) approximately the same size, or the same size, as the set of Target IPs (e.g., DF) by matching the number of viewers by time period (e.g., an hour) of the non-retailer spots with a replacement from the DF_REF sample. Such bootstrapping approach may be accomplished by first generating a last-view date-time period (e.g., hour) histogram for both Target and Reference IPs. Following the generation of the histogram and given a fallback logic, the Reference IP creation will resample with replacement over each time period (e.g., hour) bucket to achieve the desired distribution. This fallback logic may include filtering on a cluster of similar network based on the following ordered set of rules:

| Fallback Logic | Rules |
|---|---|
| 1 | same hour |
| 2 | same hour, same day of week |

-continued

| Fallback Logic | Rules |
|---|---|
| 3 | +/−1 hour, same day |
| 4 | +/−1 hour, same day of week |

Thus, in embodiments: given two datasets DF of Target IPs and DF_REF of Reference IPs, determine the sample DF according to the distribution of the DF_REF to get DF_NEW. Then, calculate a conditional probability for both DF_REF and DF_NEW. The cumulative probability difference between DF_REF and DF_NEW will then become the latency curve and the latency factor for a time period (e.g., 10 days) equals the ratio of percentages between the point where t equals the time period on the latency curve (e.g., t=10 day) and t equals the outer limit of the baseline time period on the latency curve (e.g., t=5 min) (e.g., such as depicted in FIG. 5).

Figure 10:
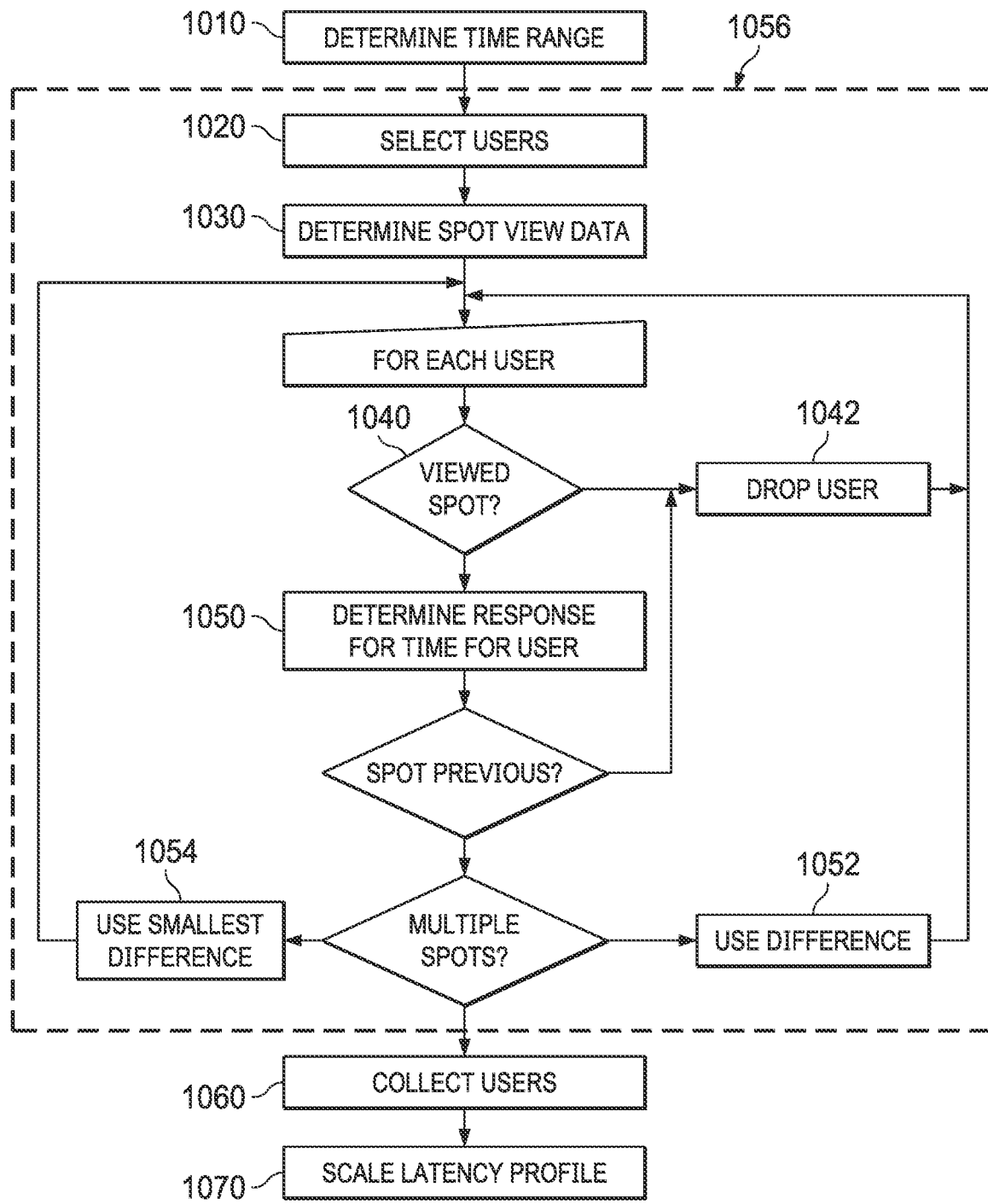
FIG. 10 is a graph of an example latency profile.

In another embodiment, a predicted number or curve of users who would have responded (e.g., access the online presence) regardless of their viewing of a spot may be quantified using a simulation based on data collected from the quantification system. FIG. 10 is a flow diagram for one embodiment of such a method for simulation. As discussed above, data collected from the quantification system may include content data such as who (e.g., device id or IP address) is watching which program on which network at what time interval and spot view data: who (e.g., device id or IP address) saw which retailer's spot during which program on which network starting at which time and ending at which time.

A baseline of responders (e.g., a baseline or Reference IP response curve) may be constructed using a simulation. In this case, as the baseline is being simulated (e.g., users that would respond regardless of their viewing of the creative), their response time (e.g. time of visiting the retailer's online presence) should be independent of whether or when they viewed the creative).

Accordingly, in one embodiment, the time range of interest (e.g., from the start_time to end_time) can be determined (STEP 1010). This may be from the spot airing time or baseline time window time (start_time) to some overall time window (end_time). Some number of (e.g., N) users (e.g., device id or IP address) may be randomly selected during this time range (STEP 1020). All the spot view data during this time range can be determined (STEP 1030).

Then for each one of the users (N) above, it can be determined if the user has seen a spot (e.g., any spot) for the retailer or not (STEP 1040). If the user has not viewed a spot for the retailer, that user may be excluded or dropped from the set of users (STEP 1042) and the next user evaluated if there are any remaining users in the set. Otherwise, if the user has viewed a spot for the retailer, a time between the start_time and end_time weighted by the traffic trend pattern may be selected as the response time for the user (STEP 1044). It can then be determined if there is any spot that starts before the determined response time (STEP 1050).

If there is no spot that starts before the determined response time that user may be excluded or dropped from the set of users (STEP 1042) and the next user evaluated if there are any remaining users in the set. Otherwise, if there is a single spot that starts before the determined response time use the difference between the spot start time and response time as the response latency (STEP 1052), while if there are multiple spots that start before the determined response time use the smallest difference between the spot start times and response time as the response latency for that user (STEP 1054). The random sampling and refinement may be repeated to determine users for each run (e.g., each repeat of LOOP 1056).

All the remaining users from the one or more runs (e.g., repetition of LOOP 1056) may be collected and grouped by response latency (according to some time period such as hours or days) and count the users in each group (called simulated response latency profile) (STEP 1060). The time period utilized may be determined based on the amount of data available and a desired signal-to-noise ration. The simulated response latency profile can then be scaled so that it matches the observed daily response latency profile on the tail of the curve (STEP 1070). This scaled simulated response latency profile may then be used as the baseline curve (e.g., for the Reference IP set).

Figure 11:
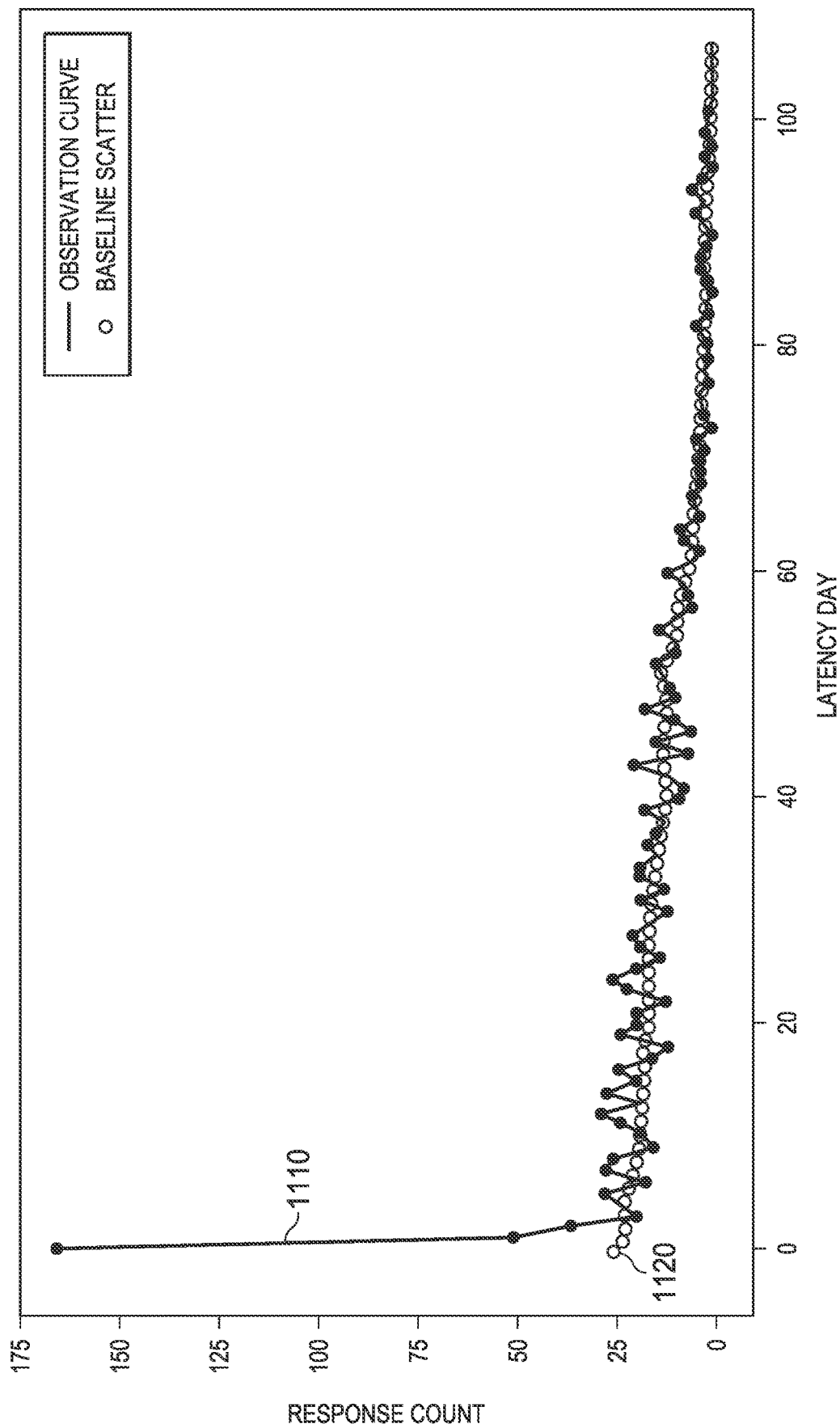
FIG. 11 is a diagram graphically depicting an example utilized in the disclosure.

Now with reference to FIG. 11, a visual depiction of an example of observed latency profiles and scaled simulated response latency profiles are determined. In the example curve 1110 is the observed (here daily) response latency profile while curve 1120 is the scaled simulated (here daily) response lag profile. In this example, the tail is defined as latencyday>=30 days. However, it will be noted here that in general, the cutoff latencyday (e.g., here 30 days) as well as the cutoff time period for immediate responses (e.g., here 5 minutes) may vary on case by case, and may be dependent on the context, including the retailer or spot of interest.

The simulated (daily) response latency profile 1120 in this example is thus scaled to the magnitude shown so that it matches the observed curve 1110 after latencyday>=30 days. In the depicted example the dotted curve 1120 between 0 and 30 days is the baseline. The differences between the curves 1110, 1120 between 0 and 30 days are the daily lift attributable to TV spots. Thus, in this example, Latency factor=Overall Lift (0 to 30 days)/Immediate Lift (0 to 5 minutes) where Overall Lift=SUM(curve 1110–curve 1120) from 0 to 30 days and Immediate Lift=SUM(curve 1110 at minute level–curve 1120 at minute level) from 0 to 5 minutes.

Certain modifications or alternatives may be utilized in some embodiments, for example DVR data may be utilized to adjust the latency factor, as it can be determined when creatines were seen and when a user responded based on actual viewing. TV viewership data can be used to compute visitor latency in a number of ways.

Additionally, in some embodiments, latency factors can be determined for certain segments of data. Specifically, in certain embodiments, these latency factors can be separated out to produce for different segments of the population by filtering the data first by that segment and computing as above. For example, to gauge the latency factor for one particular channel (e.g., network), the quantification system can first filter the data to only those viewers of that network. Then, the calculations can be performed as before.

Moreover, in certain embodiments a latency factor can be determined for, and applied to, the metric of conversions or sales lift. This conversions latency may be performed by, for the two populations (again DF comprising Target IPs that viewed a particular creative and DF_REF comprising Reference IPs that did not view that creative), attaching or determining a field for their respective sales per user after viewing the creative. Then the quantification system can use the session date timestamp as before. Thus, when determining a latency factor for conversion the only difference from the determination of latency from that described above is comparing sales lift instead of installs or UV lift.

In particular, here, in one embodiment the conversion rate on the additional sales can be determined as:

$$(\text{sales\_DF} - \text{sales\_DF\_REF})/UV\_\text{lift}$$

While the conversion rate from the above can be used directly, this data can also be used to compute one of the factors that can be used in the alternate (e.g., more real-time measure of computation). This can be done by computing the conversion rate of DF_REF by:

$$\text{sales\_DF\_REF}/UV\_\text{lift}$$

As conversion rates for both populations have been obtained, the conversion rates of the population (DF or Target IPs) that viewed the creative versus the population (DF_REF or Reference IPs) that did not view the creative can be determined. This gives an alternative view of the factor alpha from the determined conversions.

Figure 9:
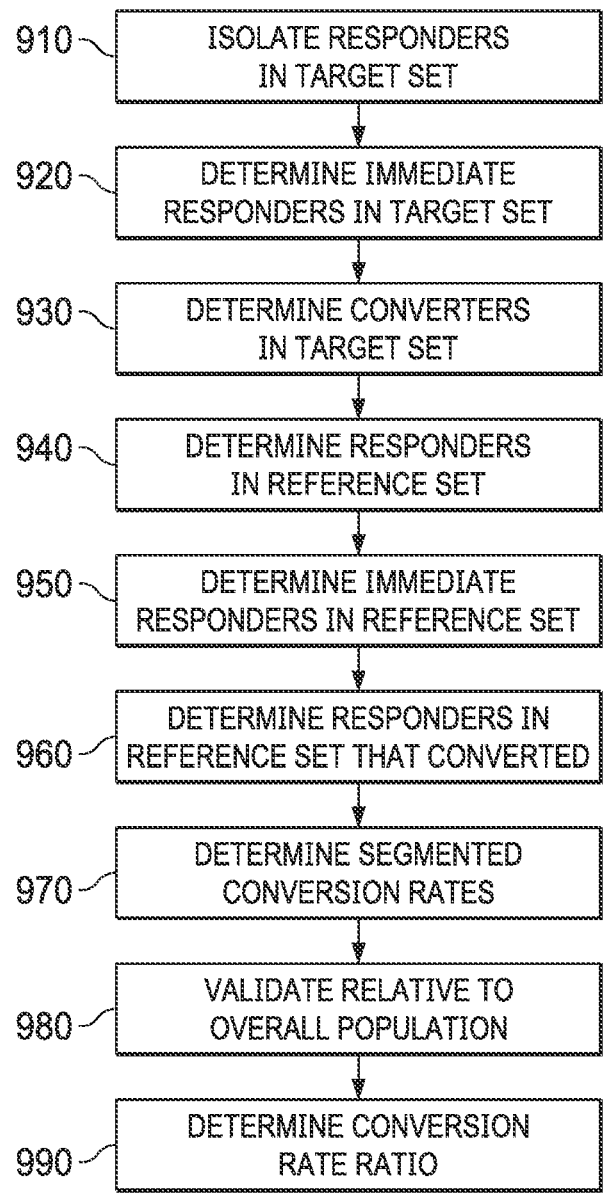
FIG. 9 is a flow diagram for one embodiment of a method for using a latency factor to quantify a metric.

Thus, similar to embodiments focused on quantifying delayed response, embodiments can also quantify conversions based on delayed responders to a retailer's creative. FIG. 9 is a flow diagram depicting one embodiment of a method for using a latency factor to quantify a metric. Initially, at step responders may be determined or isolated in the matched or merged data set (STEP 910). This determination may be done as before—identifying those who responded to a particular spot via matching IP addresses between the target viewership dataset and the client clickstream dataset. This set may be referred to as TGT resp.

Next, it can be determined which of these responders responded within the TV attribution or baseline window (e.g., first 5, 10, 20 minutes etc. after a creative airs) (STEP 920). Embodiments may analyze both sets, but embodiments may distinguish between TGT_resp_immediate (e.g., those IPs of TGT_resp that responded within the baseline window) and TGT_resp delayed (e.g., those IPs of TGT_resp that responded outside the baseline window).

The subpopulation of these target responders that 'converted' (e.g., made a purchase of one or more designated products or services) can then be determined for each of the two above populations (STEP 930). These sub populations may be referred to as TGT_resp_immediate_conv (e.g., those IPs of TGT_resp_immediate that converted) and TGT_resp delayed cony (e.g., those IPs of TGT_resp delayed that converted). In one embodiment, the timing of the conversion event may be determined for each of these determined conversions. For example, in one embodiment a rule may be applied such that the conversion event must have occurred after the time of viewing the spot for it to be credited in this determination. An overall time window (e.g., 30 days) may also be used over which to count a conversion (e.g., no conversion occurring later than this overall time window will be utilized). This capping of conversion performance may help prevent censorship bias (some data points having more time to conversion than others).

It should be noted here that in many embodiments the designated conversion metric is a purchase, but the conversion metric could be almost any desired metric, including any deeper "funnel" event on a website, such as membership registration, or some other specified event. The identifications of these events may be straightforward, as the deeper funnel conversion event may be tracked in the retailer's analytics. For example, the quantification system may track such events through a pixel placed on the retailer's site or pages thereof, or the use of other pixeling or tracking services (e.g., Google Analytics, Adobe Omniture, etc.).

Responders in the reference dataset (e.g., Reference IPs) can also be determined (STEP 940). This is done as discussed previously—identifying those who responded via matching IP addresses between the reference viewership dataset and the client clickstream dataset. This set may be referred to as REF resp.

It can then be determined which of these responders of the Reference IPS responded within the TV attribution or baseline window (e.g., first 5, 10, 20 minutes etc. after a creative airs) (STEP 950). Embodiments may analyze both sets, but embodiments may distinguish between REF_resp_immediate (e.g., those IPs of REF_resp that responded within the baseline window) and REF_resp_delayed (e.g., those IPs of REF_resp that responded outside the baseline window).

The subpopulation of these reference responders that 'converted' (e.g., made a purchase of one or more designated products or services) can then be determined for each of the two above populations (STEP 960). These sub populations may be referred to as REF_resp immediate cony (e.g., those IPs of REF_resp immediate that converted) and REF_resp_delayed cony (e.g., those IPs of REF_resp_delayed that converted). Again, in one embodiment, the timing of the conversion event may be determined for each of these determined conversions. For example, in one embodiment a rule may be applied such that the conversion event must have occurred after the time of viewing the spot for it to be credited in this determination. An overall time window (e.g., 30 days) may also be used over which to count a conversion (e.g., no conversion occurring later than this overall time window will be utilized).

The segmented conversion rates can then be determined for the determined populations (STEP 970). Here, the immediate response Target Population conversion rate can be determined by:

---

TGT_immed_convR = TGT_resp_immediate_conv ÷ TGT_resp_immediate
    Immediate response Reference Population conversion rate:
    REF_immed_convR = REF_resp_immediate_conv ÷ REF_resp_immediate
        Delayed responder Target Population conversion rate:
        TGT_delay_convR = TGT_resp_delay_conv ÷ TGT_resp_delay
        Delayed responder Reference Population conversion rate:
        REF_delay_convR = REF_resp_delay_conv ÷ REF_resp_delay
        Incremental immediate response conversion rate:
        Incr_immed_convR
            = (TGT_resp_immediate_conv
            − REF_resp_immediate_conv)/(TGT_resp_immediate
            − REF_resp_immediate)
        Incremental delayed response conversion rate:
Incr_delayed_convR
        = (TGT_resp_delayed_conv
        − REF_resp_delayed_conv)/(TGT_resp_delayed − REF_resp_delayed)

---

The determined conversion rates can then be validated versus the overall population (STEP 980). In particular, since the population of the data set of a quantification system may be a somewhat different population than the overall TV viewer population, the system can now determine how similar the conversion rates are between Incr_immed_convR and the incremental conversion rate that was determined on the whole population (e.g., based on the determination of conversion as discussed above). The differences here are usually due to three factors: noise, population differences, and differences in assumptions about active users.

The delayed versus immediate conversion rate ratio can then be determined (STEP 99). The ratio, convR_ratio=Incr_delay convR/Incr_immed_convR can be computed and applied to the conversion rate of the entire population (e.g., the determination of which is discussed above).

In one embodiment, the data may utilize a low-volume sample or a high-volume sample. As may be ascertained by review of the determination of conversion rate as set forth herein, the determination of conversion attempts to derive the incremental conversion rate that the system calculates on the whole population. However, as described above, there are some statistical assumptions in that computation. With this 'closed loop' approach (where the 'closed loop' sample is defined as the sample for which viewership data is available), the determination for the retailer may be limited to a very small population based on the percentage of viewership data that is available. Thus, the result can be less reliable if that population is too small.

Accordingly, if there is a large viewership population, then the system may rely on the incr_immed_convR as described above (e.g., incremental immediate response conversion rate), previously. However, a quantification system may make a determination that the computation of conversion rate as detailed may be more accurate (e.g., if the viewership data sample is very small (e.g., 1% of the total), then the system could alternatively leverage the incr_immed_convR as computed for the conversion rate as detailed above. If this is the case, then the system may derive the incr_delay_convR. That derivation would be computed as

---

Incr_delay_convR
    = (convR_ratio
    * incr_immed_convR) where convR_ratio is computed as convR_ratio
    = Incr_delay_convR/Incr_immed_convR

---

As may be imagined, the determination of latency factors for various metrics, such as user views or conversion, may be usefully applied in a variety of contexts for a variety of purposes, including for example, lending retailer's insights into the efficacy and cost structure of their creatives and campaigns associated with those creatives.

So, for example, some use cases for the latency factor may include use of the response latency factor to determine cost per view (CPV):

---

CPV = cost/UV_lift = cost/(UV_immed_lift * drag_factor)

---

Again, the objective for most retailers may be ultimately understanding the cost per sale (CPS) for each of their creatives, networks, and campaign as a whole. The calculation of CPS can be determined as CPS=CPV/convRate. So, using the information (as computed above), the system can compute CPS as such.

Based on the above, the system can derive the total conversion rate:

--- convRate = (incr_immed_convR * UV_immed_lift + incr_delay_convR
    * UV_delay_lift)/(UV_immed_lift + UV_delay_lift)

This can be rewritten mathematically as:

```
convRate = (incr_immed_convR * UV_immed_lift * (1 + convR_ratio *
    (drag_factor − 1))/(UV_immed_lift * drag_factor_ − CPS =
    CPV/convRate
```

Note that this is essentially the same as:

```
CPS = cost/sale
    = cost/(sales_from_immed_responders
      + sales_from_delyaed_responders)
``` but derived from the various factors as discussed above.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard drive (HD)), hardware circuitry or the like, or any combination.

Embodiments of a hardware architecture for implementing certain embodiments is described herein. One embodiment can include one or more computers communicatively coupled to a network.

At least portions of the functionalities or processes described herein can be implemented in suitable computer-executable instructions. The computer-executable instructions may be stored as software code components or modules on one or more computer readable media (such as non-volatile memories, volatile memories, direct access storage drive (DASD) arrays, magnetic tapes, floppy diskettes, hard drives, optical storage devices, etc. or any other appropriate computer-readable medium or storage device). In one embodiment, the computer-executable instructions may include lines of compiled C++, Java, hypertext markup language (HTML), or any other programming or scripting code.

Additionally, the functions of the disclosed embodiments may be shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system, comprising:
   a processor;
   a data store, the data store storing:
      spot viewing data comprising data on user views of a first spot associated with an entity through an offline network, and
      user interaction event data comprising data on user interactions with an online presence on an online network, wherein the online presence is associated with the entity associated with the first spot; and
   a non-transitory computer readable medium comprising instructions for:
      associating one or more user views of the first spot through the offline network with corresponding user interactions with the online presence of the entity on the online network;
      determining a first set of user views of the first spot that are associated with corresponding user interactions with the online presence on the online network;
      determining a first cumulative probability curve for the first set of user views which accounts for users who have responded incrementally to the first spot airing on the offline network;
      determining a second cumulative probability curve corresponding to user interactions with the online presence on the online network associated with users that did not view the first spot airing on the offline network;
      determining a latency factor to account for the effects of the first spot that occur outside a baseline window based on the difference between the first and second cumulative probability curves, wherein the latency factor reflects a relationship between an expected total incremental response at the entity's online presence on the online network relative to an immediate incremental response, wherein the expected total incremental response includes both a response to the spot airing on the offline network inside and outside the base time window;
      adjusting a metric associated with the online presence based on the latency factor; and
      generating an interface based on the adjusted metric.

2. The system of claim 1, wherein, the spot viewing data comprises data on user views of a second spot, and the instructions of the non-transitory computer readable medium comprising instructions are for:
- associating one or more user views of the second spot through the offline network with corresponding user interactions with the online presence of the entity on the online network, wherein the second spot aired at a similar time to the first spot;
- determining a second set of user views of the second spot that are associated with corresponding user interactions with the online presence on the online network;
- determining a first conditional probability curve for the first set of user views; and
- determining a second conditional probability curve for the second set of user views;
- wherein the first cumulative probability curve is determined based on the first conditional probability curve for the first set of user views and the second conditional probability curve for the second set of user views.

3. The system of claim 1, wherein the data store stores spot airing data comprising data on when the spot associated with the entity was aired on the offline network, and the instructions are for enhancing the spot airing data by adjusting a scheduled start time of at least one spot airing of the spot airing data.

4. The system of claim 3, wherein enhancing the spot viewing data by associating each view of the spot in the spot viewing data with a corresponding instance of the airing of the spot in the spot airing data based on time to adjust a spot viewing time of the view of the spot.

5. The system of claim 4, wherein the association is done using an IP address associated with both a user view of the spot and the corresponding user interaction with the online presence.

6. The system of claim 1, wherein the metric is lift or conversion rate.

7. A method, comprising:
- accessing, by a computer, a data store storing spot viewing data and user interaction event data, the spot viewing data comprising data on user views of a first spot associated with an entity through an offline network, and the user interaction event data comprising data on user interactions with an online presence on an online network, wherein the online presence is associated with the entity associated with the first spot;
- associating, by the computer, one or more user views of the first spot through the offline network with corresponding user interactions with the online presence of the entity on the online network;
- determining, by the computer, a first set of user views of the first spot that are associated with corresponding user interactions with the online presence on the online network;
- determining, by the computer, a first cumulative probability curve for the first set of user views which accounts for users who have responded incrementally to the first spot airing on the offline network;
- determining, by the computer, a second cumulative probability curve corresponding to user interactions with the online presence on the online network associated with users that did not view the first spot airing on the offline network;
- determining, by the computer, a latency factor to account for the effects of the first spot that occur outside a baseline window based on the difference between the first and second cumulative probability curves, wherein the latency factor reflects a relationship between an expected total incremental response at the entity's online presence on the online network relative to an immediate incremental response, wherein the expected total incremental response includes both a response to the spot airing on the offline network inside and outside the base time window;
- adjusting, by the computer, a metric associated with the online presence based on the latency factor; and
- generating, by the computer, an interface based on the adjusted metric.

8. The method of claim 7, wherein, the spot viewing data comprises data on user views of a second spot, and the instructions of the non-transitory computer readable medium comprising instructions are further translatable by the processor for:
- associating one or more user views of the second spot through the offline network with corresponding user interactions with the online presence of the entity on the online network, wherein the second spot aired at a similar time to the first spot;
- determining a second set of user views of the second spot that are associated with corresponding user interactions with the online presence on the online network;
- determining a first conditional probability curve for the first set of user views; and
- determining a second conditional probability curve for the second set of user views;
- wherein the first cumulative probability curve is determined based on the first conditional probability curve for the first set of user views and the second conditional probability curve for the second set of user views.

9. The method of claim 7, wherein the data store stores spot airing data comprising data on when the spot associated with the entity was aired on the offline network, and the instructions are for enhancing the spot airing data by adjusting a scheduled start time of at least one spot airing of the spot airing data.

10. The method of claim 9, wherein enhancing the spot viewing data by associating each view of the spot in the spot viewing data with a corresponding instance of the airing of the spot in the spot airing data based on time to adjust a spot viewing time of the view of the spot.

11. The method of claim 10, wherein the association is done using an IP address associated with both a user view of the spot and the corresponding user interaction with the online presence.

12. The method of claim 7, wherein the metric is lift or conversion rate.

13. A non-transitory computer readable medium, comprising instructions translatable by a processor for:
- accessing spot viewing data comprising data on user views of a first spot associated with an entity through an offline network, and user interaction event data comprising data on user interactions with an online presence on an online network, wherein the online presence on the online network is associated with the entity associated with the first spot through the offline network;
- associating one or more user views of the first spot through the offline network with corresponding user interactions with the online presence of the entity on the online network;
- determining a first set of user views of the first spot that are associated with corresponding user interactions with the online presence on the online network;

determining a first cumulative probability curve for the first set of user views which accounts for users who have responded incrementally to the first spot airing on the offline network;

determining a second cumulative probability curve corresponding to user interactions with the online presence on the online network associated with users that did not view the first spot airing on the offline network;

determining a latency factor to account for the effects of the first spot that occur outside a baseline window based on the difference between the first and second cumulative probability curves, wherein the latency factor reflects a relationship between an expected total incremental response at the entity's online presence on the online network relative to an immediate incremental response, wherein the expected total incremental response includes both a response to the spot airing on the offline network inside and outside the base time window;

adjusting a metric associated with the online presence based on the latency factor; and generating an interface based on the adjusted metric.

14. The non-transitory computer readable medium of claim 13, wherein, the spot viewing data comprises data on user views of a second spot, and the instructions of the non-transitory computer readable medium comprising instructions are for:

associating one or more user views of the second spot through the offline network with corresponding user interactions with the online presence of the entity on the online network, wherein the second spot aired at a similar time to the first spot;

determining a second set of user views of the second spot that are associated with corresponding user interactions with the online presence on the online network;

determining a first conditional probability curve for the first set of user views; and determining a second conditional probability curve for the second set of user views;

wherein the first cumulative probability curve is determined based on the first conditional probability curve for the first set of user views and the second conditional probability curve for the second set of user views.

15. The non-transitory computer readable medium of claim 13, wherein the data store stores spot airing data comprising data on when the spot associated with the entity was aired on the offline network, and the instructions are for enhancing the spot airing data by adjusting a scheduled start time of at least one spot airing of the spot airing data.

16. The non-transitory computer readable medium of claim 15, wherein enhancing the spot viewing data by associating each view of the spot in the spot viewing data with a corresponding instance of the airing of the spot in the spot airing data based on time to adjust a spot viewing time of the view of the spot.

17. The non-transitory computer readable medium of claim 16, wherein the association is done using an IP address associated with both a user view of the spot and the corresponding user interaction with the online presence.

18. The non-transitory computer readable medium of claim 13, wherein the metric is lift or conversion rate.

* * * * *